(12) United States Patent
Chhajer et al.

(10) Patent No.: US 11,650,071 B2
(45) Date of Patent: May 16, 2023

(54) USER PREFERENCE BASED VEHICLE DATA COMMUNICATION AND CONTROL

(71) Applicant: Honda Motor Co., Ltd., Tokyo (JP)

(72) Inventors: Rajeev Chhajer, Powell, OH (US); Brian D. Coy, Powell, OH (US); Benjamin J. Davis, Torrance, CA (US); Christopher Getts, Columbus, OH (US); Anthony Fontana, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 558 days.

(21) Appl. No.: 16/801,403

(22) Filed: Feb. 26, 2020

(65) Prior Publication Data

US 2021/0262820 A1 Aug. 26, 2021

(51) Int. Cl.
*G01C 21/36* (2006.01)
*G07C 5/00* (2006.01)
*H04W 4/40* (2018.01)
*H04W 4/029* (2018.01)
*G06Q 30/0207* (2023.01)
(Continued)

(52) U.S. Cl.
CPC ....... *G01C 21/3667* (2013.01); *G06F 3/0486* (2013.01); *G06F 3/1462* (2013.01); *G06Q 30/018* (2013.01); *G06Q 30/0205* (2013.01); *G06Q 30/0224* (2013.01);
(Continued)

(58) Field of Classification Search
CPC . G01C 21/3667; G06F 3/0486; G06F 3/1462; G06Q 30/018; G06Q 30/0205; G06Q 30/0224; G06Q 50/265; G07C 5/008; H04W 4/029; H04W 4/40; H04W 4/021;
(Continued)

(56) References Cited

U.S. PATENT DOCUMENTS 5,184,303 A 2/1993 Link
6,864,807 B2 3/2005 Todoriki et al.
(Continued)

FOREIGN PATENT DOCUMENTS

JP 2002208093 A 7/2002
JP 2016206715 A 12/2016
(Continued)

OTHER PUBLICATIONS

ChargeMap Mobile app 2014, https://www.youtube.com/watch?v=5BmA3DUQMi0, Sep. 30, 2014.*
(Continued)

*Primary Examiner* — Muhammad Shafi
(74) *Attorney, Agent, or Firm* — Morgan Lincoln; American Honda Motor Co., Inc.

(57) ABSTRACT

An electronic device that includes a display screen and circuitry is provided. The display screen displays map data and a user interface (UI) element. The circuitry receives a first user input, via the UI element. The first user input indicates a geographical region on the displayed map data. The circuitry extracts geo-location information from vehicle data associated with a vehicle. The circuitry further controls a communication of a first portion of the vehicle data with a server based on a first geo-location in the extracted geo-location information of the vehicle data and the indicated geographical region. The first portion of the vehicle data corresponds to the first geo-location.

19 Claims, 8 Drawing Sheets

(51) Int. Cl.
    *G06F 3/0486*     (2013.01)
    *G06Q 50/26*     (2012.01)
    *G06Q 30/018*     (2023.01)
    *G06Q 30/0204*     (2023.01)
    *G06F 3/14*     (2006.01)

(52) U.S. Cl.
    CPC ........... *G06Q 50/265* (2013.01); *G07C 5/008* (2013.01); *H04W 4/029* (2018.02); *H04W 4/40* (2018.02)

(58) Field of Classification Search
    CPC ........... G09G 2354/00; G09G 2356/00; G09G 2380/10
    USPC ......................................................... 701/409
    See application file for complete search history.

(56) References Cited

U.S. PATENT DOCUMENTS

| | | | |
|---|---|---|---|
| 7,487,918 B2 | 2/2009 | Kudo et al. | |
| 8,126,903 B2 | 2/2012 | Lehmann et al. | |
| 8,392,116 B2 | 3/2013 | Lehmann et al. | |
| 8,509,987 B2 | 8/2013 | Resner | |
| 8,742,950 B2 | 6/2014 | Schunder et al. | |
| 8,781,728 B2 | 7/2014 | Yoshioka et al. | |
| 2006/0040239 A1 | 2/2006 | Cummins et al. | |
| 2011/0184784 A1* | 7/2011 | Rudow | G06Q 10/0639 701/29.6 |
| 2013/0158854 A1* | 6/2013 | Weir | G08G 1/0129 701/400 |
| 2013/0226449 A1 | 8/2013 | Rovik et al. | |
| 2014/0028257 A1* | 1/2014 | Nishida | B60L 53/305 320/109 |
| 2014/0129080 A1 | 5/2014 | Leibowitz et al. | |
| 2017/0098197 A1 | 4/2017 | Yu et al. | |

FOREIGN PATENT DOCUMENTS

| | | | |
|---|---|---|---|
| JP | 2018097676 A | | 6/2018 |
| KR | 20020088707 A | | 11/2002 |
| KR | 101315468 B1 | * | 10/2013 |
| WO | 2017205961 A1 | | 12/2017 |

OTHER PUBLICATIONS

How To Find Free EV Charging Stations on a Trip—Plugshare App, https://www.youtube.com/watch?v=GlsF91A0f0I, Feb. 3, 2019.*

* cited by examiner

| Geo-location Information | Time-stamp Information | Vehicle-log Information |
|---|---|---|
| Location-L1 | Date-DD1/MM1/YY1; Time-HH1:MM1 | Speed-S1, Fuel Efficiency-F1, Battery-B1, Trip Data-T1... |
| Location-L2 | Date-DD2/MM2/YY2; Time-HH2:MM2 | Speed-S2, Fuel Efficiency-F2, Battery-B2, Trip Data-T2... |
| Location-L3 | Date-DD3/MM3/YY3; Time-HH3:MM3 | Speed-S3, Fuel Efficiency-F3, Battery-B3, Trip Data-T3... |
| Location-L4 | Date-DD4/MM4/YY4; Time-HH4:MM4 | Speed-S4, Fuel Efficiency-F4, Battery-B4, Trip Data-T4... |

FIG. 3

USER PREFERENCE BASED VEHICLE DATA COMMUNICATION AND CONTROL

BACKGROUND

With the advancements in technology, there has been a proliferation of vehicles that may communicate with several entities like servers, other connected vehicles, and/or electronic devices, via a communication network, such as, an Internet. The vehicles may include various in-built sensors, such as, but is not limited to, a speed sensor, an engine RPM sensor, a location sensor, or the like. The vehicles may collect data from such sensors and provide the collected data to the entities like the servers. The collected data may help different organizations, linked with the servers, in various forms (such as product market research, business research, etc.). However, an owner or an occupant of the vehicle may have data security and privacy concerns with regards to the automatic communication of the data, either provided by the vehicles or directly collected by the servers. Further, there may be a lack of transparency for the owner/occupant of the vehicle towards the collection or the usage of the collected data by various organizations associated with the servers.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device may include a display screen and circuitry coupled to the display screen. The display screen may be configured to display map data and a first user interface (UI) element. The circuitry may be configured to receive a first user input, via the first UI element. The first user input may indicate a geographical region on the displayed map data. The circuitry may be further configured to extract geo-location information from vehicle data associated with a first vehicle. The circuitry may be further configured to control a communication of a first portion of the vehicle data with a server based on a first geo-location in the extracted geo-location information of the vehicle data and the indicated geographical region. The first portion of the vehicle data may correspond to the first geo-location.

A first server may include a memory configured to store vehicle data associated with a vehicle and circuitry coupled to the memory. The circuitry may be configured to receive a first user input from an electronic device, wherein the first user input may indicate a geographical region. The circuitry may be further configured to extract geo-location information from the vehicle data associated with the vehicle. The circuitry may be further configured to identify a first portion of the vehicle data based on a first geo-location in the extracted geo-location information of the vehicle data and the indicated geographical region, wherein the first portion of the vehicle data corresponds to the first geo-location. The circuitry may be further configured to update the stored vehicle data based on the identified first portion of the vehicle data.

A method is provided in an electronic device that comprises a display screen configured to display map data and a user interface (UI) element. The method may include reception of a first user input, via the UI element. The first user input may indicate a geographical region on the displayed map data. The method may further include extraction of geo-location information from vehicle data associated with a vehicle. The method further includes control of a communication of a first portion of the vehicle data with a server based on a first geo-location in the extracted geo-location information of the vehicle data and the indicated geographical region. The first portion of the vehicle data may correspond to the first geo-location.

BRIEF DESCRIPTION OF THE DRAWINGS

FIG. 3 is a table that illustrates exemplary vehicle data, in accordance with an embodiment of the disclosure.

DETAILED DESCRIPTION

Figure 1:
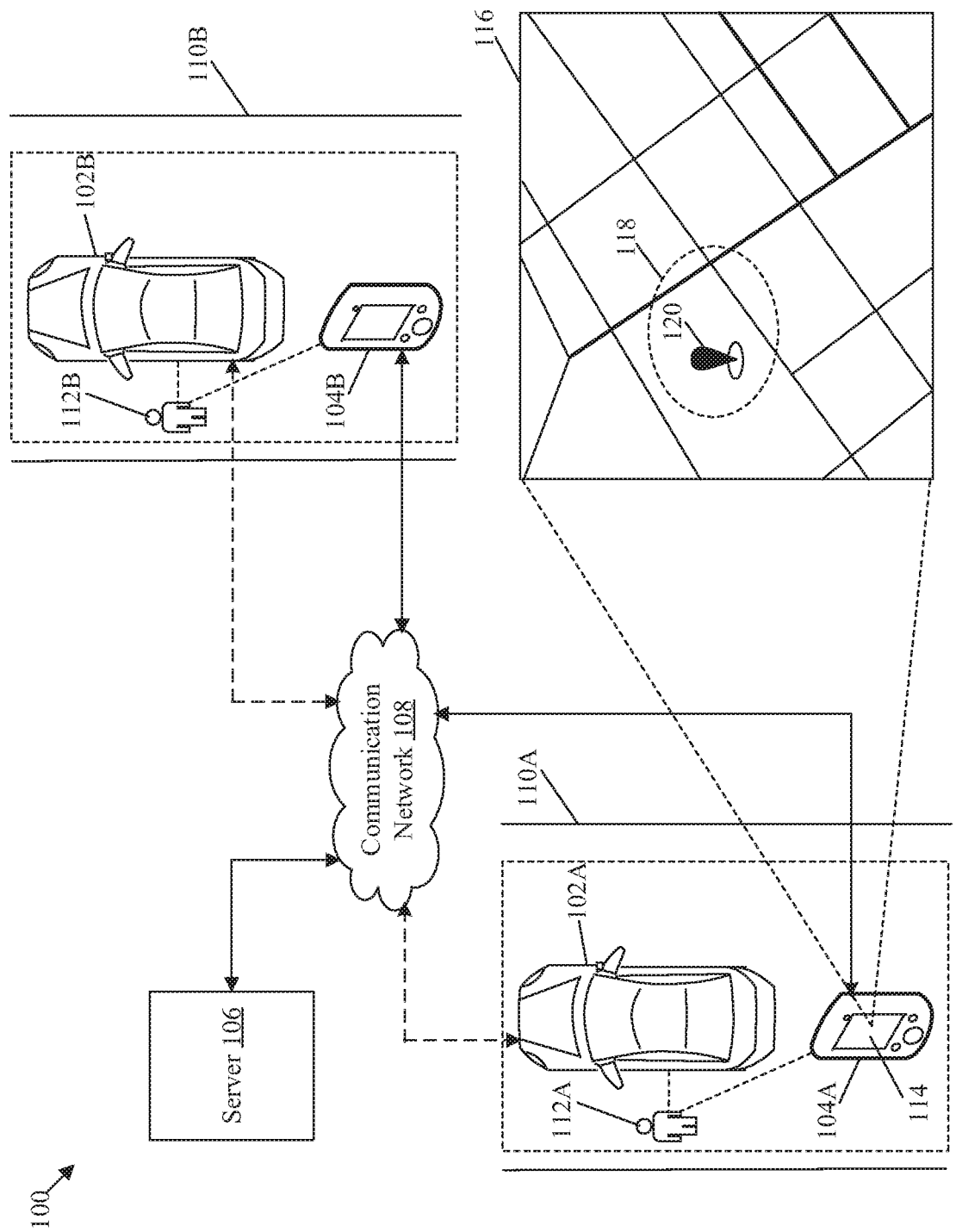
FIG. 1 is a block diagram that illustrates an exemplary environment for user preference based vehicle data communication, in accordance with an embodiment of the disclosure.

Various embodiments of the present disclosure may be found in an electronic device to control communication of vehicle data based on preferences of a user associated with the electronic device. Non-limiting examples of such vehicle data include vehicle location, vehicle trip data, vehicle sensor data, and the like. The electronic device may further receive usage of the communicated data and related benefits from a server. Additionally, one or more organizations associated with the vehicle, as described further below, may benefit from usage of the communicated data which may drive a reward system for the user. Furthermore, the received usage may provide sufficient transparency or visibility for the collected data to the user of the electronic device.

The electronic device may display map data indicating map of a geographical area, such as a town, state, or country. The electronic device may further display a user interface (UI) element helpful in the user selecting and/or marking the display, such as drag-able pointers. Further, via the UI element, the electronic device may receive a user input that may indicate a geographical region, such as a city or a state of a country, of the displayed map data. The electronic device may further control a communication of a first portion of the vehicle data with a server based on the indicated geographical region. The first portion of the vehicle data may be acquired or collected at a first geo-location, such as a particular location that was visited by the vehicle, which may be within the geographical region indicated by the user input. The control of the communication may correspond to restriction of the communication of the first portion to the server, as the first portion acquired at the first geo-location may be within the restricted geographical region set by a user of the electronic device through the user input. Thus, the electronic device may provide the user a privacy or security UI element to select the geographical region as a geo-fence, to control communication access to or restriction of the corresponding vehicle data with the server. Based on the selected user preference, which is a geo-fence in this exemplary embodiment, the electronic device may control the communication of those portions of the vehicle data that correspond to geo-locations which lie within the selected geo-fence.

In other embodiments, the electronic device may receive other user inputs (or user preferences) to select a time-period at which particular portion of the vehicle data is captured, or select a type, such as speed data, trip data, or fuel data, of the vehicle data. The electronic device may control the communication access to or restriction of portions of the vehicle data with the server based on the selected time-period or the type of vehicle data. Thus, the electronic device may provide the user, sufficient security or privacy controls over the communication of the vehicle data with the server.

The electronic device may further receive, from the server, usage information of the communicated vehicle data. The usage information may indicate how the shared vehicle data may be useful or beneficial for the server or for an organization associated with the server. The usage information may further include particular incentive or rewards for the user to share the vehicle data with the server. Thus, through the received usage information, the user of the disclosed electronic device may get adequate transparency over the vehicle data collected by the server.

Various embodiments of the present disclosure may be found in the server which may receive or store the vehicle data which may be collected from one or more vehicles captured through a plurality of sensors in the vehicles. In accordance with an embodiment, the server may receive one or more user inputs, such as the selected geographical region, selected time-period, or the type of vehicle data/sensor, from the electronic device. The one or more user inputs may be provided, via one or more user interface (UI) elements, at the electronic device by the user associated the electronic device. The server may further apply the received user inputs on the collected vehicle data and identify different portions of the vehicle data based on the application of the user inputs on the stored or collected. The server may further update the stored vehicle data based on the identified portions of the vehicle data. The update may correspond to, but is not limited to, the deletion of the identified portions based on the user inputs received from the electronic device. Thus, the disclosed server may provide the user of the electronic device sufficient transparency to view the vehicle data collected by the server, and further control corresponding portions of the vehicle data based on the user inputs provided, via different UI elements at the electronic device.

FIG. 1 is a block diagram that illustrates an exemplary environment for user preference based vehicle data communication, in accordance with an embodiment of the disclosure. With reference to FIG. 1, there is shown a network environment 100. The network environment 100 may include a first vehicle 102A and a second vehicle 102B that may travel on a first road portion 110A and a second road portion 110B, respectively. The network environment 100 further includes a first electronic device 104A, a second electronic device 104B, a server 106, and a communication network 108.

There is further shown in FIG. 1, a first user 112A and a second user 112B who may be associated with the first vehicle 102A and the second vehicle 102B, respectively. The first user 112A and the second user 112B may be further associated with or own the first electronic device 104A and the second electronic device 104B, respectively. The first user 112A and the second user 112B may be either a rider, a driver, or an owner of the first vehicle 102A and the second vehicle 102B, respectively. Further, the first vehicle 102A may have more than one occupants. There is further shown in FIG. 1, a display screen 114 of the first electronic device 104A. The display screen 114 may display map data 116, a first user interface (UI) element 118, and a geographical region 120 that may be selected by the first user 112A from the map data 116, through the first UI element 118.

It should be noted that two vehicles, two users, and two electronic devices shown in FIG. 1 are presented merely as an example. However, in some embodiments, there may be only one vehicle and electronic device, or more than two vehicles and the electronic devices (associated with respective users) communicably coupled with the server 106 (or multiple such servers), without limiting the scope of the disclosure. It may be noted that the first vehicle 102A shown in FIG. 1 are merely examples of four-wheeler vehicles. The present disclosure may be also applicable to other types of vehicles such as two-wheeler vehicles, three-wheeler vehicles, or vehicles with more than four wheels. A description of other types of vehicles has been omitted from the disclosure for the sake of brevity.

The first vehicle 102A may be a system through which a user, such as the first user 112A may travel along the first road portion 110A and the second road portion 110B, respectively, from a certain start point to a destination point. The first vehicle 102A may be an autonomous, a semi-autonomous, or a non-autonomous vehicle. Non-limiting examples of the first vehicle 102A may include an electric vehicle, a hybrid vehicle, and/or a vehicle that uses a combination of one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. In some embodiments, each of the first vehicle 102A may be a sedan-type or a hatch-back type four-wheeler vehicle. The functions of the second vehicle 102B may be same as the functions of the first vehicle 102A described, for example, in FIG. 1. Therefore, the description of the second vehicle 102B is omitted from the disclosure for the sake of brevity.

The first electronic device 104A may include suitable logic, circuitry, interfaces, and/or code that may configured to control communication of at least a portion of vehicle data associated with a corresponding vehicle (such as, the first vehicle 102A). In an embodiment, the first electronic device 104A may be configured to display the map data 116 on the display screen 114 of the first electronic device 104A.

Further, the first electronic device 104A may be configured to present the first UI element 118 on the display screen 114 over the map data 116. The map data 116 may display map information of a geographical area, such as, country, state, or a city. The first UI element 118 associated with the map information may include at least one of, but not limited to, a zoom-in/zoom-out tool, a slider tool, a set of drag-able points, user-selectable pin location points and an adjustable region around the pin location. The first electronic device 104A may be configured to receive a first user input from the first user 112A, via the first UI element 118. The first user input may indicate the geographical region 120 for control of the communication of at least a portion of the vehicle data of the first vehicle 102A with the server 106, the second vehicle 102B, or the second electronic device 104B. In an embodiment, the first electronic device 104A may be configured to extract geo-location information from the vehicle data of the first vehicle 102A. The first electronic device 104A may be configured to control the communication of a first portion of the vehicle data of the first vehicle 102A with the server 106 based on the indicated geographical region 120 and a first geo-location in the geo-location information extracted from the vehicle data of the first vehicle 102A. The first electronic device 104A may be further configured to control the communication of the portions of the vehicle data based on other user inputs, such as time-period at which different portions of the vehicle data was captured or type of vehicle data/sensors. Details related to the control of the communication of the portion of the vehicle data will be explained further, for example, in FIGS. 4A, 4B, 5A, and 5B.

The functions of the second electronic device 104B may be same as the functions of the first electronic device 104A described, for example, in FIG. 1. Therefore, the description of the second electronic device 104B is omitted from the disclosure for the sake of brevity. Non-limiting examples of the first electronic device 104A and the second electronic device 104B may include a hand-held device, a computing device, a smartphone, a cellular phone, a mobile phone, a gaming device, a mainframe machine, a server, a computer work-station, and/or a consumer electronic (CE) device. In some embodiments, the first electronic device 104A may be associated with the first vehicle 102A or may be located/integrated inside the first vehicle 102A. In such case, the first electronic device 104A may correspond to one of, but is not limited to, an in-vehicle display device, a vehicle infotainment system, a head-mounted display device, a multi-information display (MID), an automotive heads-up display (HUD), an augmented reality (AR)/virtual reality (VR) display device, an in-vehicle dashboard display device, or a vehicle instrument cluster/panel display.

Figure 6:
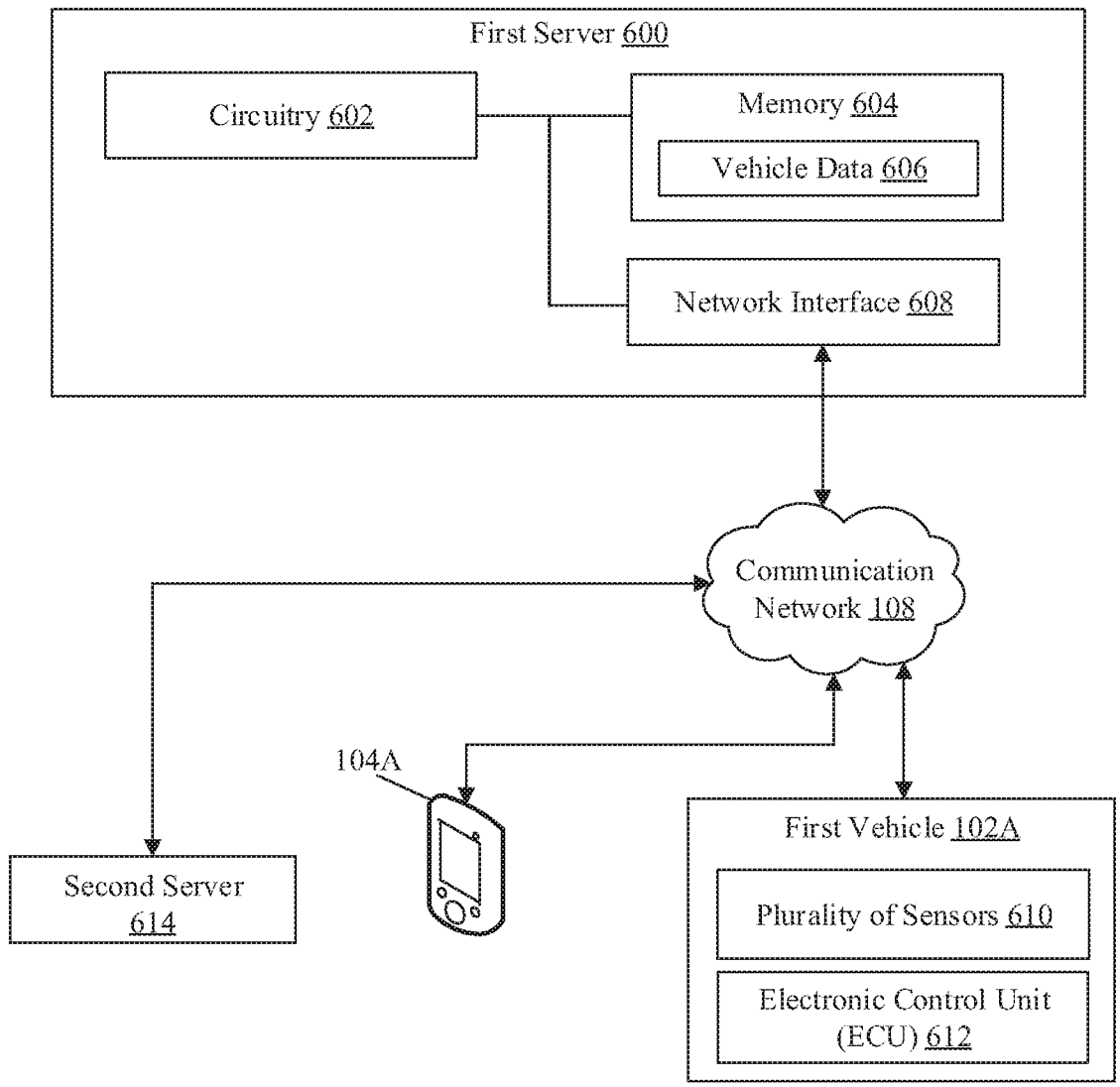
FIG. 6 is a block diagram that illustrates an exemplary server for user preference based vehicle data control, in accordance with an embodiment of the disclosure.

The server 106 may include suitable logic, circuitry, interfaces, and/or code that may configured to receive and store the vehicle data that may be received from one of the vehicle, an electronic control unit (ECU) 612 of FIG. 6, or an electronic device associated with a user of the vehicle. In an example, the server 106 may receive at least a portion of the vehicle data from the first electronic device 104A based on the control of the communication of the first portion of the vehicle data. The server 106 may be configured to communicate business information and/or reward information with the first electronic device 104A based on the received portion, such as a second portion and/or the first portion, of the vehicle data associated with the first vehicle 102A. In some embodiments, the server 106 may collect all the vehicle data from a plurality of sensors (such as plurality of sensors 610 shown in FIG. 6) from the vehicle, such as the first vehicle 102A. The server may further receive the user inputs from the first electronic device 104A and apply the received user inputs on the collected vehicle data to further identify different portions, such as the first portion, of the vehicle data. The server may further update the vehicle data with the removal of the identified portions or may communicate the identified portion to different servers. In an embodiment, the server 106 may be configured to generate statistics data associated with vehicle data associated with multiple vehicles, such as the first vehicle 102A and the second vehicle 102B. The server 106 may be associated with an organization which may be associated with the vehicle, such as the first vehicle 102A. The organization may be manufacturer of the vehicle, such as the first vehicle 102A. In some embodiments, server 106 may be implemented as a cloud server, which may be utilized to execute various operations through web applications, cloud applications, HTTP requests, repository operations, file transfer, gaming operations, and the like. Non-limiting examples of the server 106 may include a cloud server, a web server, a database server, a file server, an application server, a mainframe server, or a combination thereof.

The communication network 108 may include a communication medium through which the first vehicle 102A, the first electronic device 104A, the second vehicle 102B, the second electronic device 104B, and the server 106 may communicate with one another. Non-limiting examples of the communication network 108 may include the Internet, a cloud network, a Long Term Evolution (LTE) network, a Wireless Local Area Network (WLAN), a Local Area Network (LAN), a telephone line (POTS), and/or a Metropolitan Area Network (MAN). Various devices in the network environment 100 may be configured to connect to the communication network 108, in accordance with various wired and wireless communication protocols. Non-limiting examples of such wired and wireless communication protocols may include at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

In operation, for example, the first electronic device 104A may be configured to display the map data 116 through the display screen 114 of the first electronic device 104A to the first user 112A. The first electronic device 104A may also display the first UI element 118 on the displayed map data 116 for selection of a geographical region by the first user 112A. The first electronic device 104A may be configured to receive the first user input from the first user 112A through the first UI element 118. The first user input may indicate the geographical region 120 selected by the first user 112A for control of the communication of the first portion of the vehicle data associated with the first vehicle 102A. The geographical region 120 may be a physical region or an area (enclosed, open, or combination of both) on the map data 116. Non-limiting examples of the geographical region 120 may include a building, a park, a house, a locality, a society, a street, a town, a state, or a country. The first electronic device 104A may be further configured to extract the vehicle data associated with the first vehicle 102A from a memory (such as, a memory 204 of FIG. 2) associated with the first electronic device 104A. In some embodiments, the vehicle data may be received from the server 106 or directly from the first vehicle 102A. The vehicle data may be acquired from different vehicle sensors associated with the first vehicle 102A. In an embodiment, the vehicle data of a vehicle, such as, the first vehicle 102A, may include, but is not limited to, at least one of time-stamp information, the geo-location information, and vehicle-log information. Non-limiting examples of the vehicle-log information may include at least one of trip information, speed/velocity information, acceleration information, carbon-footprint information, fuel efficiency information, engine speed information, battery information, temperature information, vehicle model information, throttle position information, brakes information, pressure information, or driving behavior information, associated with the vehicle, such as, the first vehicle 102A. An example of the vehicle data has been explained, for example, in FIG. 3.

Further, the first electronic device 104A may extract the geo-location information from the vehicle data associated with the first vehicle 102A. The geo-location information may provide geo-location coordinates, such as GPS coordinates or address, where exactly a portion of the vehicle data may be captured or acquired. The first electronic device 104A may be configured to control the communication of the first portion of the vehicle data of the first vehicle 102A with the server 106 based on the indicated geographical region 120 and the first geo-location in the extracted geo-location information of the vehicle data of the first vehicle 102A. Herein, the first portion of the vehicle data may correspond to the first geo-location. For example, the first portion of the vehicle data may be acquired at the first geo-location. The control of the communication of the first portion of the vehicle data will be explained further, for example, in FIGS. 3, 4A, and 4B.

In certain embodiments, the control of the communication of the first portion of the vehicle data of the first vehicle 102A with the server 106 may be based on an inclusion of the first geo-location within the indicated geographical region 120 selected based on the received first user input. The control of the communication of the first portion of the vehicle data may correspond to a restriction associated with the communication of the first portion of the vehicle data with the server 106. Thus, a portion of the vehicle data that corresponds to the first geo-location (such as within the geographical region 120) may not be communicated to the server 106 by the first electronic device 104A. Further, the first electronic device 104A may allow a communication of a second portion of the vehicle data with the server 106 based on a second geo-location in the extracted geo-location information of the vehicle data and the indicated geographical region 120. The second portion of the vehicle data may correspond to the second geo-location and may be different from the first portion of the vehicle data. In an embodiment, the second geo-location may be outside the geographical region 120 indicated by the first user input. The second portion of the vehicle data may be acquired at the second geo-location.

In an embodiment, the first electronic device 104A may receive a user input from the first user 112A that may be associated with a user-selection of one or more vehicle data or sensor types. Based on such received user input of the user-selected vehicle data or sensor type, the first electronic device 104A may control (restrict or allow) the communication of different portions of the vehicle data with the server 106. The details of the user input to select the vehicle data or sensor types is described, for example, in FIG. 5A. In some embodiments, the first electronic device 104A may communicate the received user input to the server 106 to select different portions of the vehicle data collected directly from the vehicle, such as the first vehicle 102A.

In an embodiment, the first electronic device 104A may receive another user input (or preference) from the first user 112A that may indicate time-period information for restriction or allowance of communication of an associated portion of the vehicle data with the server 106. The first electronic device 104A may be configured to extract time-stamp information from the vehicle data that may include date-time data associated with various portions of the vehicle data. The date-time data may indicate a date and a time at which a certain portion of the vehicle data was captured or acquired by the first vehicle 102A. The first electronic device 104A may determine a first time-period in the extracted time-stamp information that corresponds to the time-period information. The first electronic device 104A may further control (restrict or allow) the communication of different portions of the vehicle data, associated with the first time-period, with the server 106. Details related to the selection of the time-period information and the communication of different portions of the vehicle data based on the time-period information is further described, for example, in FIG. 5B. Thus, the disclosed first electronic device 104A may provide the first user 112A with certain privacy or security options to select various combination of (but not limited to), the geographical region, time-period information, or the type of vehicle data/sensor, to further control communication access or restriction of the corresponding vehicle data with the server 106. In some embodiments, the first electronic device 104A may communicate the received user input (with respect to the time-period information) to the server 106 to select different portions of the vehicle data collected directly from the vehicle, such as the first vehicle 102A.

In an embodiment, the first electronic device 104A may be configured to control the communication of the first portion of the vehicle data of the first vehicle 102A or a communication of a second portion (different from the first portion) of the vehicle data of the first vehicle 102A, with an electronic control device of the second vehicle 102B or the second electronic device 104B. In an embodiment, the first electronic device 104A may be configured to receive driving behavior information or carbon emission information, associated with the first vehicle 102A, from the server 106, the electronic control device of the second vehicle 102B or the second electronic device 104B. In some embodiments, the first electronic device 104A may receive usage information from the server 106 which may indicate how the communicated second portion of the vehicle data may be used (or consumed or processed) by the server 106. The usage information may indicate how the shared vehicle data may be useful or beneficial for the server 106 or for an organization associated with the server 106. The usage information may further include particular incentive or rewards for the first user 112A to share the vehicle data with the server 106 in future. Based on the usage information received by the first electronic device 104A from the server 106, the first user 112A may get adequate transparency over the vehicle data collected by the server 106. This may also help organizations associated with the server 106, which may collect and use the shared vehicle data for business reasons, to comply with stringent data privacy laws. In some embodiments, the server 106 may directly collect all the vehicle data from the vehicle, such as the first vehicle 102A and may allow the user, such as the first user 112A, to view and/or update the collected vehicle data from the first electronic device 104A, via the provided user inputs as the preferences of the user, such as the first user 112A. Thus, the combination of the disclosed first electronic device 104A and the server 106 may provide the first user 112A, transparency of the collected data, adequate user controls over the collected data, and further provides relevant insights and the benefits of the vehicle data utilized by the server 106.

A person having ordinary skill in the art will understand that the scope of the disclosure may not be limited to the control of the communication of a portion of the vehicle data with the server 106, being implemented by the first electronic device 104A. In some embodiments, the first electronic device 104A may communicate the vehicle data as a whole (all portions of the vehicle data) along with various user inputs to the server 106. In such case, based on the user inputs, the server 106 may filter the communicated vehicle data to determine one or more portions of the vehicle data and may store or process the determined one or more portions in the server 106.

It may be noted that modifications, additions, or omissions may be made to FIG. 1 without departing from the scope of the present disclosure. For example, the environment 100 may include more or fewer elements than those illustrated and described in the present disclosure. For example, in some embodiments, the environment 100 may include the first vehicle 102A, the server 106, and/or the second vehicle 102B, but not the first electronic device 104A or the second electronic device 104B. In such scenario, the functionality of the first electronic device 104A and/or the second electronic device 104B may be incorporated into a respective electronic control unit, such as the electronic control unit (ECU) 612 in FIG. 6, of the first vehicle 102A and/or the second vehicle 102b, without deviation from the scope of the disclosure.

Figure 2:
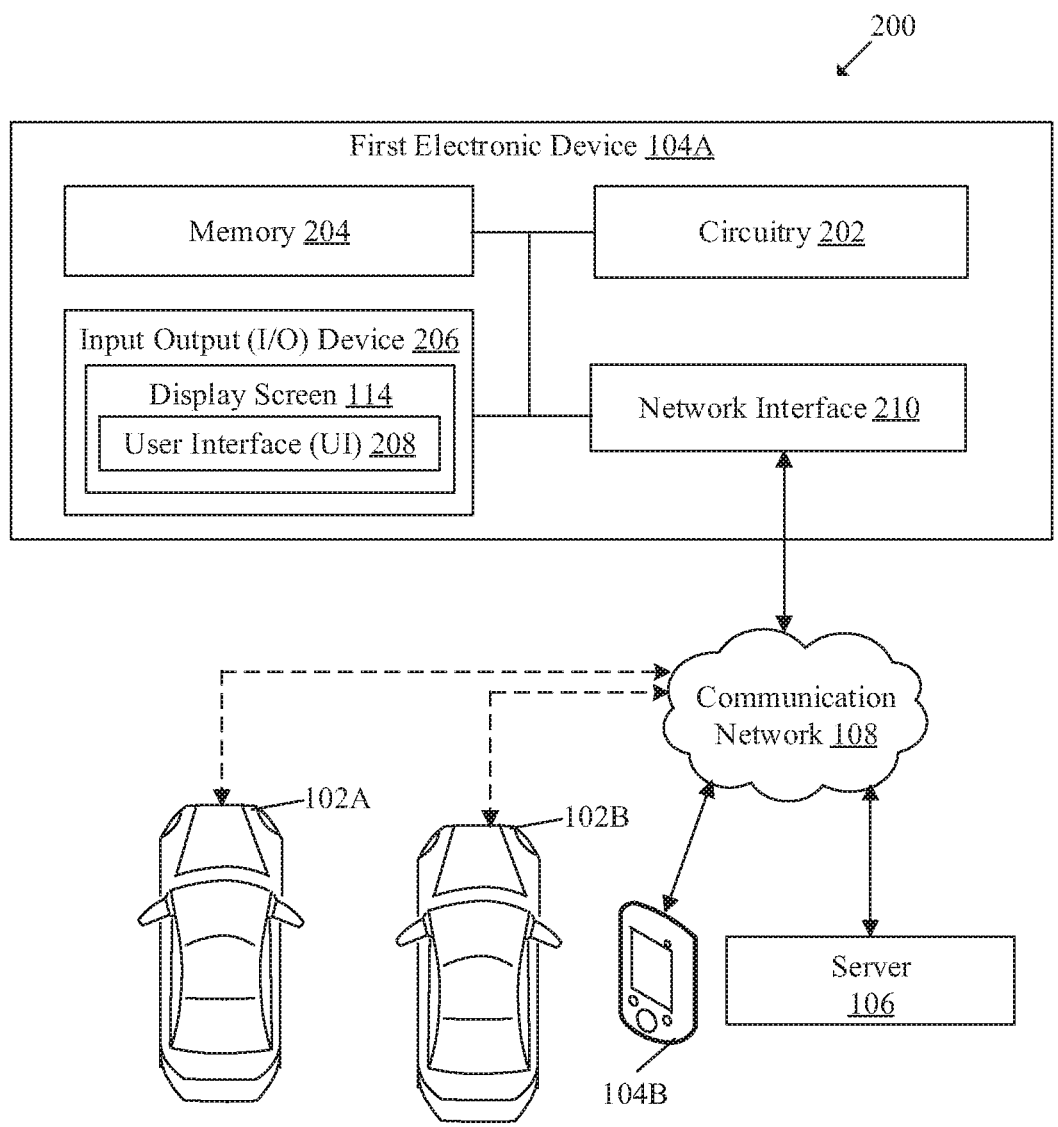
FIG. 2 is a block diagram that illustrates an exemplary electronic device for user preference based vehicle data communication, in accordance with an embodiment of the disclosure.

FIG. 2 is a block diagram that illustrates an exemplary electronic device for user preference based vehicle data communication, in accordance with an embodiment of the disclosure. FIG. 2 is explained in conjunction with elements from FIG. 1. With reference to FIG. 2, there is shown a block diagram 200 of the first electronic device 104A. The first electronic device 104A may include circuitry 202, a memory 204, an input/output (I/O) device 206, and a network interface 210. The I/O device 206 may further include a display screen 114 and a user interface (UI) 208. The network interface 210 may connect the first electronic device 104A with the server 106, the first vehicle 102A, the second vehicle 102b, and/or the second electronic device 104b, via the communication network 108.

The circuitry 202 may include suitable logic, circuitry, and interfaces that may be configured to execute program instructions associated with different operations to be executed by the first electronic device 104A. For example, some of the operations may include reception of the first user input from the first user 112A via a first UI element 118 (shown in FIG. 1) and extraction of the geo-location information from the vehicle data associated with the first vehicle 102A. The circuitry 202 may be further configured to control the communication of the first portion or the second portion of the vehicle data with the server 106. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store the one or more instructions to be executed by the circuitry 202. The memory 204 may be configured to store the vehicle data associated with the first vehicle 102A. The memory 204 may be further configured to store user-preferences (such as, the first user input associated with the geographical region 120 and user inputs associated with the time-period information and/or the type of the vehicle data or sensor) to control vehicle data communication with the server 106. The memory 204 may further store business information, the reward information, information related to driving behavior of the first user 112A, and the usage information (as described above) associated with the use/processing of the vehicle data by the server 106. Non-limiting examples of implementation of the memory 204 may include Random Access Memory (RAM), Read Only Memory (ROM), Electrically Erasable Programmable Read-Only Memory (EE-PROM), Hard Disk Drive (HDD), a Solid-State Drive (SSD), a CPU cache, and/or a Secure Digital (SD) card.

The I/O device 206 may comprise suitable logic, circuitry, interfaces, and/or code that may be configured to receive an input and provide an output based on the received input. The I/O device 206 may include various input and output devices, which may be configured to communicate with the circuitry 202. Non-limiting examples of the I/O device 206 may include a touch screen, a keyboard, a mouse, a joystick, a display device, such as the display screen 114, a microphone, or a speaker. In some embodiments, the user inputs, such as the first user input associated with the geographical region 120, and user inputs associated with the time-period information and/or the vehicle sensor data points, may be received through the I/O device 206.

The display screen 114 may comprise suitable logic, circuitry, and interfaces that may be configured to display an output of the first electronic device 104A. The display screen 114 may be utilized to render the map data 116 and the UI 208. In an embodiment, the UI 208 may receive the first user input associated with the geographical region 120 selected by the first user 112A. Further, the display screen 114 may display a UI to receive the user input associated with the type of the vehicle data or sensors, for example, as described in FIG. 5A. The display screen 114 may be further configured to display a UI to receive the user input associated with the time-period information, for example, as described in FIG. 5B. In addition, the display screen 114 may display the business information, the reward information and the usage information, which may be received from the server 106. In some embodiments, the display screen may display the vehicle data directly collected by the server 106 from different vehicles, such as the first vehicle 102A. In some embodiments, the display screen 114 may be an external display device associated with the first electronic device 104A. The display screen 114 may be a touch screen which may enable a user to provide a user input via the display screen 114. The touch screen may be at least one of a resistive touch screen, a capacitive touch screen, a thermal touch screen or any other touch screen using which inputs can be provided to the display screen 114 or the circuitry 202. The display screen 114 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 114 may refer to a display screen of a head mounted device (HMD), a smart-glass device, a see-through display, a projection-based display, an electro-chromic display, or a transparent display.

The network interface 210 may comprise suitable logic, circuitry, interfaces, and/or code that may be configured to facilitate communication between the first electronic device 104A, the first vehicle 102A, the server 106, the second electronic device 104B, and/or the second vehicle 102B, via the communication network 108. The network interface 210 may be implemented by use of various known technologies to support wired or wireless communication of the first electronic device 104A with the communication network 108. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 210 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The operations of the circuitry 202 are described, for example, in FIGS. 3, 4A, 4B, 5A, 5B, and 7. It may be noted that the first electronic device 104A may include various components or systems. The description of the other components or systems of the first electronic device 104A is omitted from the disclosure for the sake of brevity.

FIG. 3 is a table that illustrates exemplary vehicle data, in accordance with an embodiment of the disclosure. FIG. 3 is explained in conjunction with elements from FIGS. 1 and 2. With reference to FIG. 3, there is shown a table 300. The table 300 includes columns such as, geo-location information 302, time-stamp information 304, and vehicle-log information 306. As shown in FIG. 3, the table 300 may include multiple rows, where each row may correspond a portion of the vehicle data such as, but not limited to a first portion 308, a second portion 310, a third portion 312, and a fourth portion 314. For example, information or data included in the table 300 may indicate the vehicle data acquired from the vehicle, such as the first vehicle 102A.

In an embodiment, the vehicle data (such as, data values included in the table 300) of a vehicle (such as the first vehicle 102A) may include, but is not limited to, at least one of the geo-location information (such as data values in the column geo-location information 302), the time-stamp information (such as, data values in the column time-stamp information 304), and the vehicle-log information (such as, data values in the column vehicle-log information 306). Non-limiting examples of the vehicle-log information may include at least one of trip information, speed/velocity information, acceleration information, carbon-footprint information, fuel efficiency information, engine speed information, battery information, temperature information, vehicle model information, throttle position information, brakes information, pressure information, or driving behavior information, associated with the vehicle, such as, the first vehicle 102A.

As shown in the table 300 of FIG. 3, for example, the data values in the geo-location information 302 may include "Location-L1", "Location-L2", "Location-L3", and "Location-L4". The geo-location information 302 may indicate exact geo-location where the corresponding portion (such the first portion 308) of the vehicle data has been captured or acquired. Non-limiting examples of the geo-location information 302 may include GPS coordinates, address, or a name of a street/state/country/landmark. Further, the data values in the time-stamp information 304 may include "Date-DD1/MM1/YY1; Time-HH1:MM1", "Date-DD2/MM2/YY2; Time-HH2:MM2", "Date-DD3/MM3/YY3; Time-HH3:MM3", and "Date-DD4/MM4/YY4; Time-HH4:MM4". The time-stamp information 304 may indicate the exact date time at which the corresponding portion (such the first portion 308) of the vehicle data has been captured or acquired. Furthermore, as shown in the table 300, the vehicle-log information 306 may include different values of parameters, such as, but not limited to, trip data, vehicle speed, vehicle fuel efficiency, vehicle temperature, or vehicle battery, acquired from the corresponding vehicle sensor at a particular date-time, such as time-stamp information 304, or at particular geo-location, such as geo-location information 302. Non-limiting examples of the trip data may include information related to a journey undertaken by a vehicle, time taken for the journey, distance covered in the journey, hard braking information, information related to the turns taken in the journey, stop points associated with the journey, or fuel efficiency of the vehicle during the journey.

In an example, the first portion 308 of the vehicle data may indicate the vehicle-log information 306 as the speed-S1 of 40 KM per hour, the fuel efficiency-F1 as 15 KM per liter of fuel, battery-B1 as 60% remaining battery, and an 80 KMs distance covered in 2 hours as trip data-T1 which may be acquired at "Mountain View, Calif." location (such as the geo-location information 302) and at 13:30 time (such as the time-stamp information 304). In another example, the second portion 310 of the vehicle data may indicate the vehicle-log information 306 captured at "Santa Clara, Calif." location (such as the geo-location information 302) at 10:30 time (such as the time-stamp information 304). For example, the vehicle-log information 306 corresponding to the second portion 310 may include the information as the speed-S2 of 50 KM per hour, 17 KM per liter of fuel as the fuel efficiency-F2, 55% as the remaining battery-B2 and a 100 KMs distance covered in 2 hours as trip data-T2). It may be noted that the vehicle data shown in FIG. 3 is presented merely as exemplary values of the vehicle data. The present disclosure may be also applicable to other types of the vehicle data and other types of values of the vehicle-log information in various formats. A description of other types of the vehicle data is omitted from the disclosure for the sake of brevity.

Figure 4A:
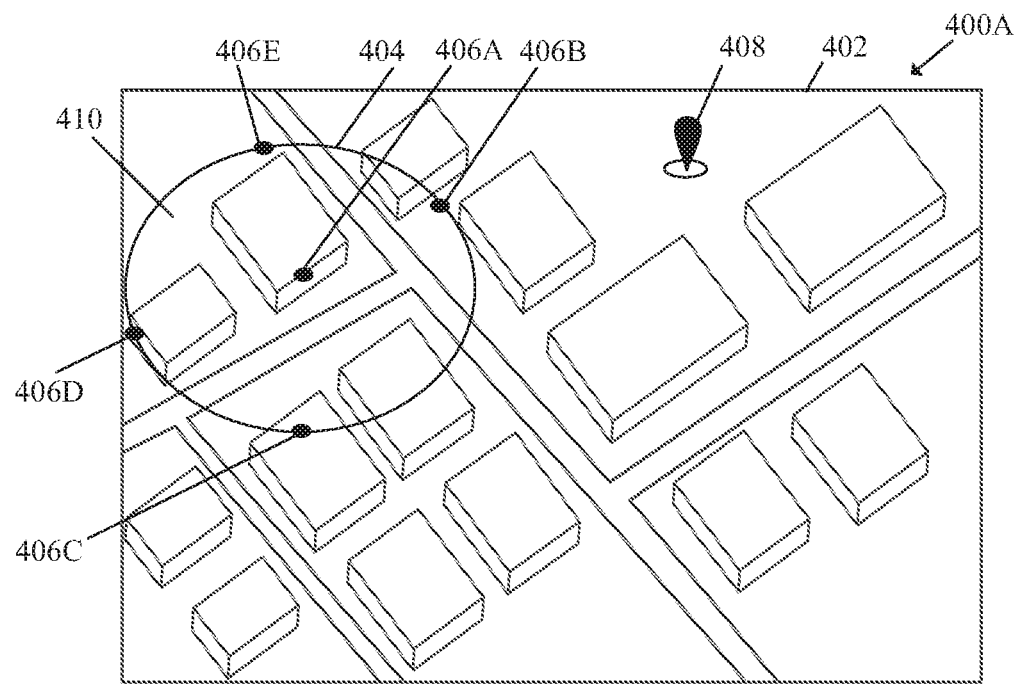
FIGS. 4A and 4B collectively illustrate an exemplary first user interface that may be presented on the electronic device of FIG. 2 to receive a first user input and a second user input to control vehicle data communication, in accordance with an embodiment of the disclosure.
Figure 4B:
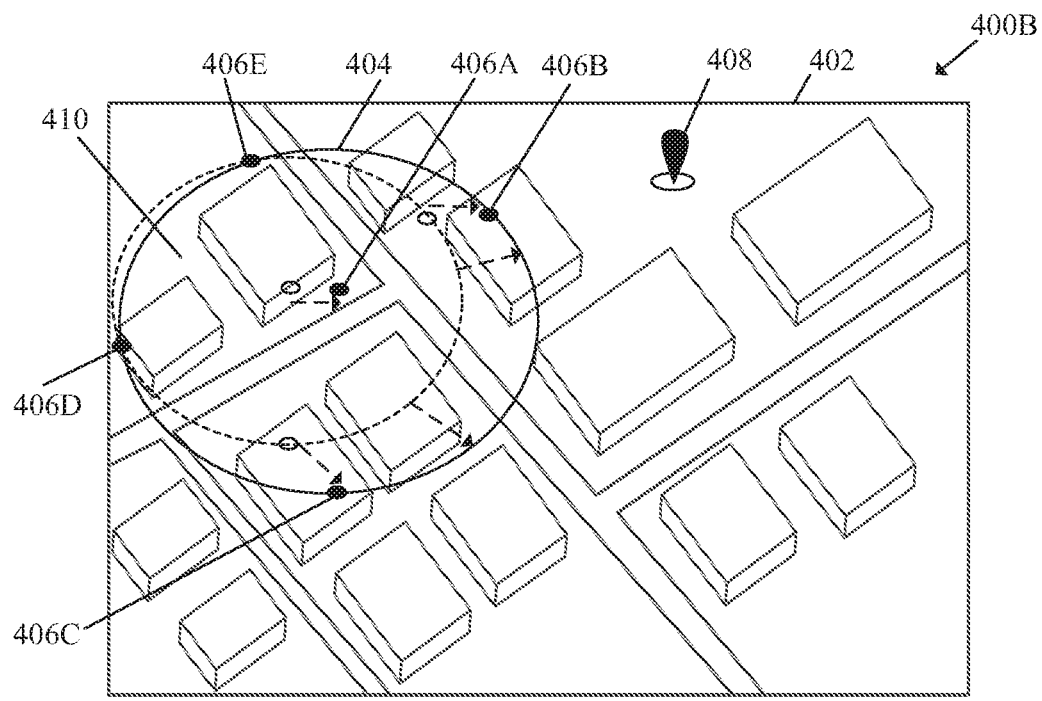

FIGS. 4A and 4B collectively illustrate an exemplary first user interface that may be presented on the electronic device of FIG. 2 to receive a first user input and a second user input to control vehicle data communication, in accordance with an embodiment of the disclosure. FIGS. 4A and 4B are explained in conjunction with elements from FIGS. 1, 2, and 3. With reference to FIGS. 4A and 4B, there are shown a user interface (UI) 400A and a UI 400B, respectively that may be presented on the display screen 114 of the first electronic device 104A. Each of the UI 400A and the UI 400B may include map data 402 that may be displayed on a display screen (such as, the display screen 114 of the first electronic device 104A). The map data 402 may be associated with a geographical area 408, such as, but is not limited to, a landmark, a point-of-interest (POI), a physical space, a street, a locality, a street, a town, a city, a state, or a country. The map data 402 may include a first UI element 404 that may further include a plurality of drag points, such as, a first drag point 406A, a second drag point 406B, a third drag point 406C, a fourth drag point 406D, and a fifth drag point 406E (hereinafter collectively referred as the plurality of drag points 406). The plurality of drag points 406 may be overlaid on the displayed map data 402. Each of FIG. 4A and FIG. 4B also illustrates a geographical region 410 that may be user-selected from the displayed map data 402, via the first UI element 404. The geographical region 410 may be a GPS location (or coordinate), a landmark, a point-of-interest (POI), or other physical location selected based on the first UI element 404. In some embodiments, each of the physical spaces (for example a building, a street, a landmark, a town, a village, a city, a state or a country) or the combination may be selected as the geographical region 410. In such case, a circle represented in FIG. 4A by the first UI element 404 may correspond to the geographical region 410 which may include multiple GPS locations or coordinates. In some embodiments, the geographical region 410 may be represented as a physical region defined by a center location and a predefined radius distance, such as in meters, kilometers, or miles, around the center location.

It may be noted that the map data 402, the first UI element 404, and the geographical region 410 shown in each of FIG. 4A and FIG. 4B are presented merely as examples of the map data 116, the first UI element 118, and the geographical region 120 of FIG. 1, respectively. The present disclosure may be also applicable to other types and representations of map data, UI element, and geographical region. For example, the map data may be presented as list of geo-locations and/or the geographical co-ordinates of the list of geo-locations. The UI element may be provided as a zoom-in/zoom-out tool, a, arbitrary shape selection tool, a slider tool, a pointer-tool, and the like. Further, the geographical region 410 may be indicated based on geo-locations and a radius of distance around the indicated geo-location. A description of the other types of map data, UI element, and geographical regions have been omitted from the disclosure for the sake of brevity. Further, it may be noted that the five number of plurality of drag points 406 shown in each of FIG. 4A and FIG. 4B is presented merely as an example. The plurality of drag points 406 may include only one drag point or more than five drag points for selection of the geographical region 410, without deviation from the scope of the disclosure. For the sake of brevity, only five drag points are shown as the plurality of drag points 406 in each of FIG. 4A and FIG. 4B With reference to FIG. 4A, the circuitry 202 of the first electronic device 104A may be configured to display the map data 402 on the display screen 114 of the first electronic device 104A. In an embodiment, the circuitry 202 may be configured to prompt the first user 112A to select the geographical area 408, via the UI 208 of the first electronic device 104A. The circuitry 202 may be configured to download the map data 402 associated with the selected geographical area 408 from the server 106. Alternatively, the memory 204 may pre-store map information for a plurality of geographical areas. Based on the selection of the geographical area 408 by the first user 112A, the circuitry 202 may extract the map data 402 associated with the selected geographical area 408 from the pre-stored map information in the memory 204 and display the map data 402 on the display screen 114. In certain scenarios, the circuitry 202 may detect the current location of the first electronic device 104A (and the first user 112A) by use of location sensors (such as, Global Positioning System (GPS) sensors) associated with the first electronic device 104A and/or the first vehicle 102A. The circuitry 202 may be further configured to extract map information associated with the detected current location from the server 106 or another navigational device/server, and may display the extracted map information as the map data 402 on the display screen 114.

In an embodiment, the circuitry 202 may be configured to receive a first user input from the first user 112A, via the first UI element 404. The first user input may indicate the geographical region 410 selected by the first user 112A based on a user-placement of the plurality of drag points 406 on the displayed map data 402. In an embodiment, each of the plurality of drag points 406 of the first UI element 404 may correspond to a geo-location of a plurality of geo-locations on the displayed map data 402. Further, the indicated geographical region 410 selected by the first user 112A may include the plurality of geo-locations (or GPS coordinates, landmarks, point-of-interest) associated with the plurality of drag points 406. In an example, via the first UI element 404, the circuitry 202 may receive a user input from the first user 112A that may indicate a user-placement of the first drag point 406A near a geo-location that may correspond to the central location. The circuitry 202 may receive a set of user inputs from the first user 112A that may indicate user-placements of the second drag point 406B, the third drag point 406C, the fourth drag point 406D, and the fifth drag point 406E around the first drag point 406A on the displayed map data 402, via the first UI element 404. The circuitry 202 may then display (or select or modify) the indicated geographical region 410 on the map data 402 based on user-placements of the plurality of drag points 406 of the first UI element 404. For example, the first UI element 404 may include the central point, such as the first drag point 406A, that may be surrounded by a circle, an ellipse, a rectangle, a square, or any polygon of points formed by the plurality of drag points 406 (other than the fifth drag point 406E) that may encompass the central point. A person having ordinary skill in the art will understand that the scope of the disclosure should not be limited to the shape of the geographical region 410 shown in FIG. 4A. The geographical region 410 may have any arbitrary shape without departure from the scope of the disclosure. In some embodiments, rather than using the plurality of drag points 406, the geographical region 410 may be selected or defined based on text information (such as name of the geo-location, landmark, a town/city/state/country) provided as the first user input, via the I/O device 206.

In an embodiment, the circuitry 202 may be further configured to extract or retrieve the geo-location information 302 from the vehicle data (as shown in the table 300 in FIG. 3) of a vehicle (such as, the first vehicle 102A. In an embodiment, the vehicle data may be stored in the memory 204 of the first electronic device 104A. In some embodiments, the vehicle data (the table 300 in FIG. 3) may be stored in the server 106. In such case, the vehicle data may be collected by the server 106 directly from the plurality of sensors of the vehicle (as described in FIG. 6). With the extraction of the geo-location information 302, the disclosed first electronic device 104A may determine at which particular location the corresponding portion, such as the first portion 308 or the second portion 310, of the vehicle data has been captured or collected in past using one or more vehicular sensors associated with the first vehicle 102A.

In an embodiment, the circuitry 202 may control a communication of the first portion 308 of the vehicle data with the server 106, based on a first geo-location, such as "Location-L1", in the extracted geo-location information 302 of the vehicle data and the indicated geographical region 410 indicated by the first UI element 404. The first portion 308 of the vehicle data may correspond to the first geo-location ("Location-L1"). In other words, the vehicle-log information 306 in the first portion 308 may be collected at the first geo-location ("Location-L1"). The circuitry 202 may be further configured to determine whether the first geo-location ("Location-L1") in the extracted geo-location information 302 may geographically lie within the geographical region 410 as selected by the first user 112A. The geographical region 410 may a restricted region or area selected by the first user 112A. For example, the geographical region 410 may be a sensitive region for the first user 112A. Non-limiting examples of the sensitive region may include a home region, a region of work, a region that includes school/college of family members (like kids), a region associated with a healthcare facility, a region associated with a legal consultant, a defense related area, or any particular geo-location region as per the preference of the first user 112A. Further, the control of the communication of the first portion 308 of the vehicle data with the server 106 may be based on an inclusion of the first geo-location ("Location-L1") within the indicated geographical region 410. The control of the communication of the first portion 308 may correspond to a restriction associated with the communication of the first portion 308 of the vehicle data with the server 106. The restricted control may indicate that the first portion 308 may not be communicated with the server 106 (or collected by the server 106) since the first portion 308 was acquired at the first geo-location ("Location-L1") which is within the sensitive, private, or restricted region, such as the geographical region 410, set or preferred by the first user 112A.

For example, the geographical area 408 that corresponds to the displayed map data 402 may be the state of "California", and the indicated geographical region 410 may be "Santa Clara, Calif." set by the first user 112A, via the first UI element 404. The circuitry 202 may determine the corresponding geo-location in the geo-location information 302 of each of a plurality of portions, such as. the first portion 308, the second portion 310, in the vehicle data, as shown in FIG. 3. For example, the circuitry 202 may determine whether the first geo-location ("Location-L1") is within the indicated geographical region 410, like the first geo-location ("Location-L1") may correspond to a particular locality, road, street, building, landmark, point-of-interest, or other location located within "Santa Clara, Calif." which may be selected as the geographical region 410, such as sensitive or private region. Accordingly, based on the determination that the first geo-location of the first portion 308 is included or located within the geographical region 410, the circuitry 202 may control communication access or restriction of the first portion 308 with the server 106. In some embodiments, the circuitry 202 may not allow (or grant access) the server 106 to collect the first portion 308 from the vehicle data acquired from the first vehicle 102A, since the first portion 308 was acquired from the sensitive or private region preferred or set by the first user 112A through the first UI element 404. Thus, the disclosed first electronic device 104A may allow the first user 112A to control the sharing or acquisition of the vehicle data (either stored or monitored at real-time basis) with the server 106 using the first UI element 404 on the displayed map data 402. In some embodiments, the server 106 may directly collect all the vehicle data from the vehicles, such as the first vehicle 102A. For example, the circuitry 202 of the first electronic device 104A may allow the first user 112A to login to a web application related to the server 106 and view the vehicle data, like in table 300, collected by the server 106. The circuitry 202 may be configured to receive user inputs, via the I/O device 206, to select (or update or remove) particular portions of the collected data by the server 106. Thus, the disclosed server 106 may provide sufficient transparency to the first user 112A to view or control the vehicle data collected by the server 106. The circuitry 202 may control the vehicle data by transmission of the first user input (related to the geographical region 410 as geo-fence) to the server 106.

In an embodiment, the circuitry 202 may be further configured to allow a communication of the second portion 310 of the vehicle data with the server 106 based on a second geo-location, such as "Location-L2" in FIG. 3, in the extracted geo-location information 302 of the vehicle data and the indicated geographical region 410. The second portion 310 of the vehicle data may correspond to the second geo-location ("Location-L2") or may be acquired at the second geo-location ("Location-L2"). In some embodiments, the second portion 310 may be different from the first portion 308 of the vehicle data. For example, the second geo-location ("Location-L2") may be physically or geographically outside the indicated geographical region 410. In such case, the circuitry 202 may determine that the second geo-location ("Location-L2") is not within the sensitive or restricted region, such as the geographical region 410, and further control (i.e. allow) the communication of the second portion 310 of the vehicle data with the server 106. Thus, the circuitry 202 may allow communication or collection of the portions, such as second portion 310, of the vehicle data which may not be collected or acquired within the restricted or sensitive geographical region set by the first user 112A using the first UI element 404. In some embodiments, the circuitry 202 may apply the process to allow or restrict the communication on each portion of the vehicle data stored in the memory 204 based on the geographical region 410 preferred by the first user 112A and the corresponding geo-location information 302. In other embodiment, the circuitry 202 may apply the process to allow or restrict the communication on each portion of the vehicle data to be acquired (say from the electronic control unit (ECU) 612 or the plurality of sensor 610 shown in FIG. 6) of the first vehicle 102A.

With reference to FIG. 4B, the circuitry 202 may receive a second user input, via one of the plurality of drag points 406 on the displayed map data 402, to update the geographical region 410. The received second user input to update the geographical region 410 or size of the geographical region 410 may correspond to a change in the user-placement of one or more of the plurality of drag points 406 on the displayed map data 402. In other words, the first user 112A may drag one of the plurality of drag points 406 to expand or reduce the size of the geographical region 410. For example, the first user 112A may select and drag the first drag point 406A, the second drag point 406B, and the third drag point 406C to update or expand the size of the geographical region 410. As shown in FIG. 4B, the previous geographical region 410 (similar to the geographical region 410 shown in FIG. 4A) has been depicted by dotted lines, while the updated expanse of the geographical region 410 has been depicted by solid lines in FIG. 4B. For example, the updated or expanded geographical region 410 may include, but is not limited to, new landmarks, new point-of-interest, new streets, new buildings, or other new physical spaces as shown in FIG. 4B. In some embodiments, the updated geographical region 410 may include new GPS coordinates. The updated geographical region 410 may shift the center point, such as the first drag point 406A, as shown in FIG. 4B. A person skilled in the art will understand that though FIG. 4B illustrates the updated geographical region 410 (depicted with solid lines of the first UI element 404) as larger than the previous geographical region 410 (depicted with dotted lines of the first UI element 404), the scope of the disclosure may not be so limited. In certain scenarios, the updated geographical region 410 may be smaller than the previous geographical region 410, without departure from the scope of the disclosure. In such case, the circuitry 202 may receive the second user input via one of the plurality of drag points 406 to reduce the size of the geographical region 410.

In an embodiment, the circuitry 202 of the first electronic device 104A may generate an alert to the first user 112A on the UI 208, based on the detection that the first electronic device 104A and/or the first vehicle 102A enters or exits the indicated geographical region 410. Based on the alert, the circuitry 202 may prompt the first user 112A to provide the second user input to update the indicated geographical region 410 (via the UI 400B). Thus, the first user 112A may be aware about the presence of the first electronic device 104A or the first vehicle 102A inside the geographical region 410 and accordingly update the size of the geographical region 410 based on his/her requirements either to expand or reduce the size of the geographical region 410.

A person having ordinary skill in the art would understand that the UI 400A and the UI 400B are exemplary user interfaces that may be presented on the display screen 114 of the first electronic device 104A and the scope of the disclosure may not be so limited. Other implementations of the UI 400A and the UI 400B may be possible without departure from the scope of the disclosure. A description of other implementations of user interfaces has been omitted from the disclosure for the sake of brevity.

In an embodiment, the circuitry 202 may be further configured to control the communication of the first portion 308 of the vehicle data of the first vehicle 102A or a communication of the second portion 310 of the vehicle data with the electronic control unit, such as an ECU 612 in FIG. 6 of the second vehicle 102B. In an embodiment, the circuitry 202 may allow the communication of the second portion 310 of the vehicle data with the second vehicle 102B, via vehicle-to-vehicle (V2V) communication. The circuitry 202 may be further configured to receive driving behavior information or carbon emission information, associated with the first vehicle 102A from the server 106 or the ECU 612 of the second vehicle 102B.

In an example, the server 106 or the ECU 612 of the second vehicle 102B may determine the driving behavior information associated with the first vehicle 102A based on at least one of, but not limited to, the trip information, the speed information, the braking information, fuel efficiency information, or the engine RPM information, included in the portions of the vehicle data shared by the first vehicle 102A. Non-limiting examples of the driving behavior information of the first vehicle 102A may include a driving pattern, such as learner or expert, a braking behavior, an average speed maintained, mileage, re-fueling behavior, associated with the first vehicle 102A Further, the server 106 or the ECU 612 of the second vehicle 102B may determine the carbon emission information associated with the first vehicle 102A based on at least one of, but not limited to, the trip information, the fuel efficiency information, and the vehicle model information, included in the portions, such as the second portion 310, of the vehicle data shared by first vehicle 102A.

In an embodiment, the circuitry 202 may be further configured to receive the business information from the server 106, based on the communication of the second portion 310 of the vehicle data of the first vehicle 102A with the server 106. The business information provided by the server 106 may be associated with an organization that may manage, maintain, subscribe, or use the server 106 for business purposes. Non-limiting examples of the business information may include marketing information, new product information, advertisement information, or location-based services information, or new business information. In an embodiment, the business information may include the usage information which may indicate that how the communicated or collected portions (such the second portion 310) of the vehicle data are/will be used by the server 106 or the organization associated with the server 106. In an example, the second portion 310 of the vehicle data may correspond to (or may be captured at) the second geo-location (such as "Location-L2") that may be a geo-location of interest for the organization of the server 106 due to business reasons.

In an embodiment, based on the geo-location information in the trip data that may be collected by the server 106, an organization associated with the server 106 may determine trends associated with business related footfall. For example, the server 106 (or another analytics server of the organization) may determine geo-locations at which a footfall of vehicles of certain types (such as particular brand) is more. Accordingly, the organization may update a marketing or advertisement strategy in the particular regions. The organization may generate the business information based on the updated marketing/advertisement strategy and transmit the business information to electronic devices, such as the first electronic device 104A, or vehicles in the particular regions.

In an embodiment, the circuitry 202 may be further configured to receive the usage information, associated with a use or processing of the vehicle data of the first electronic device 104A, by the server 106 and/or an organization that manages, maintains, or subscribes to the server 106. The usage information may indicate how the vehicle data of the first vehicle 102A has been used by the server 106 or the organization and what benefits the organization has derived from the collected vehicle data. For example, the usage information may indicate a set of business or marketing strategies that the organization has derived based on the collected vehicle data.

Hence, the organization may use the server 106 to transmit the business information or the usage information to the first electronic device 104A based on the communication of the second portion 310 of the vehicle data with the server 106. The reception of the business information (or the included usage information) by the first electronic device 104A may encourage the first user 112A to further share the vehicle data with the server 106 for non-sensitive geo-locations. This may further increase the transparency or visibility of the communicated portions of the vehicle data for the first user 112A. The first user 112A may gain trust on the server 106 (or the associated organization) for being transparent that how the communicated portions of the vehicle data has being used or helped the organization to achieve corresponding business goals. For example, the second portion 310 or corresponding portions of the vehicle data may be of interest to the organization that may benefit the organization to understand or explore market research, user behavior research, and other business research areas. Based on the received business information and/or the usage information, the first electronic device 104A may receive a user input from the first user 112A that may correspond to a response or feedback of the first user 112A on the received business information and/or the usage information. The circuitry 202 may be further configured to transmit the received user input as the response or the feedback of the first user 112A, to the server 106. The user input may further help the organization to collect insights related to customer/user feedback/response on the organization's marketing campaigns.

In an embodiment, the circuitry 202 may be further configured to receive reward information from the server 106 based on the collected portions, such as the second portion 310, of the vehicle data from the first vehicle 102A. In other words, the reception of the reward information may be based on the control of the communication of the first portion 308 or the second portion 310 of the vehicle data of the first vehicle 102A. Non-limiting examples of the reward information may include discount information, offer information, coupon information, redeemable points, or gifts codes provided to the first user 112A associated with the first vehicle 102A. In an embodiment, the circuitry 202 may be configured to receive the reward information based on at least one of the driving behavior information, the carbon-emission information, or the fuel efficiency information, associated with the first vehicle 102A determined based on the collected portions of the vehicle data. Thus, the organization or the associated server 106 may provide incentive to the first user 112A for a predetermined efficiency or improvement thereof in the driving behavior, the carbon-emission, and/or the fuel efficiency, associated with the first vehicle 102A. This may further incentivize or educate the first user 112A to improve his/her driving behavior and re-tune the first vehicle 102A to reduce carbon emissions and improve fuel efficiency. In some embodiments, the server 106 or the second vehicle 102B may provide information to the first vehicle 102A about the impact of the carbon-emission to environment and provide certain instructions to reduce carbon emission of the first vehicle 102A. In some embodiments, the server 106 may provide the reward information to the first user 112A to allow sharing certain portions of the vehicle data of particular location or time frame, which has helped the server 106 or the associated organization to make better business decisions or strategies. The received reward information or other benefits may further encourage or motivate the user, such as first user 112A, to share various portions of the vehicle data which may be potential for the server 106 or the associated organization in future.

Figure 5A:
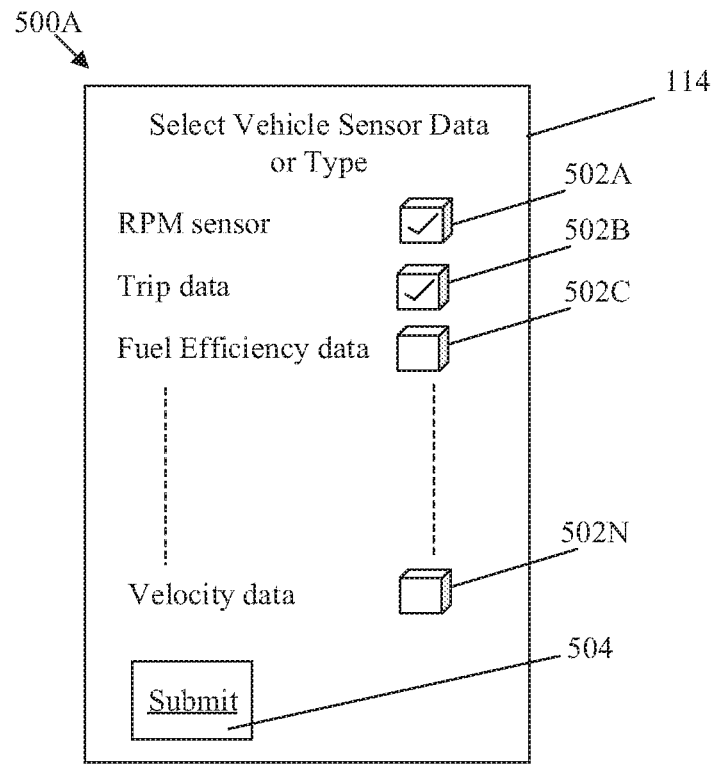
FIG. 5A illustrates an exemplary second user interface that may be presented on a display screen of the electronic device of FIG. 2 to receive a third user input to control vehicle data communication, in accordance with an embodiment of the disclosure.

FIG. 5A illustrates an exemplary second user interface that may be presented on a display screen of the electronic device of FIG. 2 to receive a third user input to control vehicle data communication, in accordance with an embodiment of the disclosure. FIG. 5A is explained in conjunction with elements from FIGS. 1, 2, 3, 4A, and 4B. With reference to FIG. 5A, there is shown a user interface (UI) 500A that may be presented on the display screen 114 of the first electronic device 104A. As shown in FIG. 5A, the UI 500A may include a second set of UI elements 502A to 502N. The UI 500A may further include a second UI element 504. Each of the second set of UI elements 502A to 502N may be one of, but not limited to, a checkbox or a radio-button. The second UI element 504 may correspond to, but not limited to, a button as shown in FIG. 5A.

In an embodiment, the circuitry 202 may be configured receive a third user input from the first user 112A, via the second set of UI elements 502A to 502N displayed on the display screen 114. With reference to FIG. 5A, the UI 500A may prompt the first user 112A of the first electronic device 104A to provide the third user input to select various types of vehicle data or sensor, that the first user 112A may wish to share with the server 106 or want the server 106 to collect either from the first electronic device 104A or directly from the vehicles. Each of the second set of UI elements 502A to 502N may correspond to at least one of multiple sensors (such as, a plurality of sensors 610 of FIG. 6) of the first vehicle 102A or types of the vehicle data. For example, as shown in FIG. 5A, the first user 112A may select the UI element 502A associated with a rotation per minute (RPM) sensor and the UI element 502B associated with the trip data. Based on the selection, the circuitry 202 may retrieve or select various portions, such as the second portion 310 or other portions, of the vehicle data, which may include the data collected from the RPM sensor or considered as the trip data, such as data related to different routes, location history, hard brakes, or past journeys followed by the first vehicle 102A. The circuitry 202 may be further configured to receive a user input, via the second UI element 504, to confirm the selection of the vehicle data or types of the vehicle sensors, selected via the second set of UI elements 502A to 502N. The circuitry 202 may be further configured to control a communication of the selected or retrieved portions of the vehicle data of the first vehicle 102A with the server 106. Therefore, in addition to the selection of the geographical region 410 as described, for example, in FIG. 4A, the disclosed first electronic device 104A may also allow the first user 112A to manually select various types of vehicle data or sensors to further allow or restrict the communication of different portions of the vehicle data with the server 106. The different portions were selected from the stored vehicle data based on the selection of various types of vehicle data or sensors by the first user 112A, as shown in FIG. 5A. The combination of the selection of the geographical region 410 (as shown in FIG. 4A) and the types of vehicle data/sensors (as shown in FIG. 5A) may provide the enhanced control over the sharing of the vehicle data with the server 106. In some embodiments, the circuitry 202 may consider the selection of the types of vehicle data or sensor for the communication of the portions of the vehicle data that may be captured on real-time basis (not only on the stored vehicle data). In some embodiments, the selection of the geographical region 410 and the types of the vehicle data/sensors (as the first user input and the third user input) may be communicated to the server 106 such that the server 106 may collect the vehicle data or process the already collected vehicle data based on the geographical region 410 (geo-fence) and the types of vehicle data or sensors selected by the first user 112A at the first electronic device 104A.

In an embodiment, the circuitry 202 may be configured to display the vehicle data, as shown in table 300 of FIG. 3, on the display screen 114. The circuitry 202 may receive user inputs associated with user-selection of one or more portions, such as the first portion 308 or the second portion 310, from the displayed vehicle data for further communication of the selected portions with the server 106.

In another embodiment, the circuitry 202 may display portions of the vehicle data that have already been communicated by the first electronic device 104A to the server 106. The circuitry 202 may receive user inputs associated with user-selection of one or more portions, such as the second portion 310, from the displayed portions of the vehicle data that the first user 112A may wish to update or delete from the server 106. The first electronic device 104A may communicate an instruction to the server 106 to update or delete the corresponding selected portions based on received user inputs. Based on the receipt of such instructions, the server 106 may update or delete the corresponding selected portions, such as the second portion 310, from a storage (such as a memory 604 in FIG. 6) associated with the server 106. For example, the first user 112A may select a portion of the vehicle data associated with a certain geo-location to update or for deletion of information related to that portion of the vehicle data from the server 106.

In yet another embodiment, the circuitry 202 may receive user inputs that may be a user-selection of a part of a certain portion, such as the second portion 310, of the vehicle data that may have already been communicated by the first electronic device 104A with the server 106 or directly collected by the server 106. The received user inputs may indicate that the first user 112A wishes to update or delete the user-selected part of the portion from the storage associated with the server 106. In an example, the part may correspond to the trip information associated with a previous trip of the first user 112A. For example, the first user 112A may want to delete all the trip information directly collected by the server 106 within the sensitive region, such as the geographical region 410.

Figure 5B:
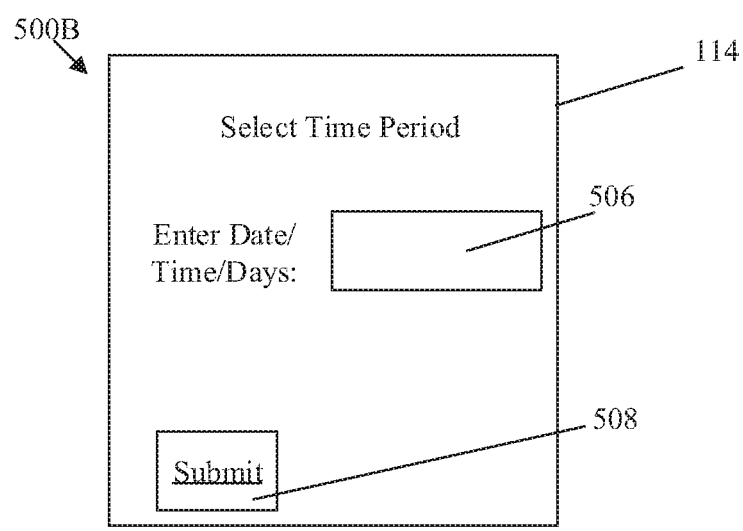
FIG. 5B illustrates an exemplary third user interface that may be presented on a display screen of the electronic device of FIG. 2 to receive a fourth user input to control vehicle data communication, in accordance with an embodiment of the disclosure.

FIG. 5B illustrates an exemplary third user interface that may be presented on a display screen of the electronic device of FIG. 2 to receive a fourth user input to control vehicle data communication, in accordance with an embodiment of the disclosure. FIG. 5B is explained in conjunction with elements from FIGS. 1, 2, 3, 4A, 4B, and 5A. With reference to FIG. 5B, there is shown a user interface (UI) 500B that may be presented on the display screen 114 of the first electronic device 104A. As shown in FIG. 5B, the UI 500B may include a third UI element 506 and a fourth UI element 508. The third UI element 506 may be one of, but not limited to, a textbox, a dropdown list, a selection list-box, or a date/time-picker. The fourth UI element 508 may be, but is not limited, a button as shown in FIG. 5B.

In an embodiment, the circuitry 202 may be configured to receive a fourth user input from the first user 112A, via the third UI element 506 displayed on the display screen 114. The fourth user input may indicate time-period information for control of the communication of a particular portion (such as the first portion 308) of the vehicle data with the server 106. For example, based on the input time-period information, the first user 112A may provide a range of date and time values. In an example, the range of the date and time values in the fourth user input may include a date-time from "01/01/19; 01:00 hours" to "02/01/19; 23:30 hours". The time-period information may be any time interval, such as a time duration in a particular day, a particular day in a week, a particular week in a month, or a particular month in a year. For example, the time-period information may indicate a time between 8:00 AM to 10:00 AM in the morning, which may be a private time for the first user 112A to drop his/her kids to school, day-care or college. In another example, the first user 112A may input "Sunday" as the time-period information, via the third UI element 506 as "Sunday" may a holiday for the first user 112A. The time-period information may be provided by the first user 112A to control (restrict or allow) the communication of one or more portions of the vehicle data (stored in the memory 204) which may be captured during the time interval indicated by the input time-period information. For example, the first user 112A wants to restrict the communication of the portions, such as trip data, of the vehicle data acquired during the morning time (say 8:00 AM to 8:00 PM) when the first user 112A drops his/her kids to the school or day-care. In an embodiment, the circuitry 202 may receive a user input, via the fourth UI element 508, to submit the input time-period information. The circuitry 202 may further store the input time-period information (as a user preference) in the memory 204 for further processing, such as identification and communication of the vehicle data based on the input time-period information.

In an embodiment, to identify the portions of the stored vehicle data for restriction, the circuitry 202 may be further configured to extract the time-stamp information 304 (as shown in FIG. 3) from the vehicle data (table 300 in FIG. 3) of the first vehicle 102A stored in the memory 204. The circuitry 202 may be configured to control the communication of the first portion, such as the first portion 308 of the vehicle data of the first vehicle 102A with the server 106 based on a first time-period ("Date-DD1/MM1/YY1; Time-HH1:MM1" as shown in FIG. 3) in the extracted time-stamp information 304 and the time-period information indicated by the fourth user input. The first portion 308 of the vehicle data of the first vehicle 102A may correspond to the first time-period. In other words, the first portion 308 of the vehicle data is acquired, such as by one of the plurality of sensors 610 shown in FIG. 6, at a time indicated by the first time-period included in the extracted time-stamp information 304. In continuation with the above example of the indicated time-period information and the extracted time-stamp information 304, the circuitry 202 may further determine whether the first time-period in the extracted time-stamp information 304 may lie within the indicated time-period information. For example, in case the first time-period of the first portion 308 indicates a time (say 7:00 AM in morning) and the time-period information is between 8:00 AM to 10:00 AM in morning, the circuitry 202 may determine that the first time-period lie within the time-period information as input based on the fourth user input. In other words, the first portion 308 of the vehicle data is captured (by one of the plurality of sensors 610) at the time, 7:00 AM, that may be within the time-period information which may be input as the restricted time by the first user 112A. Based on the determination, the circuitry 202 may be further configured to control the communication of the first portion 308 of the vehicle data with the server 106. As the first time-period of the first portion 308 may lie within the time-period information, the circuitry 202 may restrict the communication of the first portion 308 of the vehicle data with the server 106. In an embodiment, the circuitry 202 may allow a communication of a second portion, such as the second portion 310, of the vehicle data in case a second time-period (like "Date-DD2/MM2/YY2; Time-HH2:MM2" shown in FIG. 3) is not within or out of the time-period information input by the first user 112A, via the third UI element 506. Similarly, the circuitry 202 may process each portion of the vehicle data stored in the memory 204, extract the corresponding time-period in the time-stamp information 304 and control (allow or restrict) the communication with the server 106 based on the input time-period information. Thus, in addition to the restriction related to geographical region 410 (as described, for example in FIG. 4A), the selection of the types of vehicle data/sensor (as described, for example in FIG. 5A), the disclosed first electronic device 104A may allow the first user 112A to apply the restriction in the communication of the vehicle data based on the time-period information set by the corresponding user of the first electronic device 104A. Thus, the disclosed first electronic device 104A may provide an enhanced security and privacy control based on the combination of geographical region 410, the time-period information and the manual selection of the type of vehicle data or sensors. In some embodiments, the circuitry 202 may consider the selection of the time-period information for the communication of the portions of the vehicle data that may be captured on real-time basis (not only for the communication of the stored vehicle data).

In some embodiments, the selection of the geographical region 410, the types of the vehicle data/sensors, and the time-period information (as the first user input, the third user input, and the fourth user input, respectively) may be communicated to the server 106 such that the server 106 may collect the vehicle data or process the already collected vehicle data based on the geographical region 410 (geo-fence), the types of vehicle data or sensors, and the time-period information provided by the first user 112A at the first electronic device 104A.

It may be noted that the UI 500A and the UI 500B shown in FIGS. 5A and 5B are presented merely as examples of user interfaces that may be presented on the display screen 114 of the first electronic device 104A. The present disclosure may be also applicable to other types of user interfaces to select the types of vehicle data/sensor or the time-period information. A description of other types of user interfaces is omitted from the disclosure for the sake of brevity.

FIG. 6 is a block diagram that illustrates an exemplary server for user preference based vehicle data control, in accordance with an embodiment of the disclosure. FIG. 6 is explained in conjunction with elements from FIGS. 1, 2, 3, 4A, 4B, 5A, and 5B. With reference to FIG. 6, there is shown a block diagram of a first server 600 which may be similar to the server 106 of FIG. 1. The first server 600 may include circuitry 602, a memory 604, and the network interface 608. The memory 604 may include or store vehicle data 606. In FIG. 6, there is further shown a first vehicle (such as the first vehicle 102A) may include a plurality of sensors 610 and an electronic control unit (ECU) 612. There is further shown a first electronic device (such as the first electronic device 104A) in FIG. 6. The network interface 608 may connect the first server 600 with the first vehicle 102A, the first electronic device 104A, a second server 614, via the communication network 108.

The circuitry 602 may include suitable logic, circuitry, and interfaces that may be configured to execute program instructions associated with different operations to be executed by the first server 600. For example, some of the operations may include reception of the vehicle data 606 from the vehicles (such as from the plurality of sensors 610 of the first vehicle 102A), reception of the user inputs, such as the geographical region 410, from the first electronic device 104A and extraction of the geo-location information, such as the geo-location information 302 from the vehicle data 606 associated with the first vehicle 102A. The circuitry 602 may be further configured to identify a first portion, such as the first portion 308, of the vehicle data 606 of the first vehicle 102A based on a first geo-location in the extracted geo-location information 302 and received user inputs, such as the indicated geographical region 410. The first portion 308 of the vehicle data 606 may correspond to the first geo-location, such as "Location-L1" in FIG. 3. In an embodiment, the identification of the first portion 308 of the vehicle data 606 may be based on an inclusion of the first geo-location within the indicated geographical region 410 (as the received user input from the first electronic device 104A). Further, the circuitry 602 may be further configured to update or delete the stored vehicle data 606 based on the identified first portion 308 of the vehicle data 606.

The circuitry 602 may be implemented based on a number of processor technologies known in the art as described in reference to circuitry 202.

The memory 604 may include suitable logic, circuitry, and interfaces that may be configured to store the one or more instructions to be executed by the circuitry 602 of the first server 600. The memory 604 may be configured to store the vehicle data 606 associated with the first vehicle 102A. In some embodiments, the memory 604 may store the user inputs, such as geographical region 410, the selected type of vehicle data or sensors, the time-period information received from the first electronic device 104A. The functionalities of the memory 604 may be similar to the functionalities of the memory 204 of the first electronic device 104A.

The network interface 608 may comprise suitable logic, circuitry, interfaces, and/or code that may be configured to facilitate communication between the first vehicle 102A, the first electronic device 104A, and the first server 600, via the communication network 108. The functions of the network interface 608 may be same as the functions of the network interface 210 described, for example, in FIG. 2. Therefore, the description of the network interface 608 is omitted from the disclosure for the sake of brevity.

The plurality of sensors 610 may include suitable logic, circuitry, interfaces, and/or code that may be configured to capture or acquire the vehicle data 606 of the first vehicle 102A. The vehicle data 606 of the first vehicle 102A may include, but is not limited to, the geo-location information 302, the time-stamp information 304, and the vehicle-log information 306 of the first vehicle 102A, as also shown in FIG. 3. Non-limiting examples of the vehicle-log information of the first vehicle 102A may include at least one of trip information, speed/velocity information, acceleration information, carbon-footprint information, fuel efficiency information, engine speed information, battery information, temperature information, vehicle model information, throttle position information, brakes information, pressure information, or driving behavior information, associated with the first vehicle 102A. Non-limiting examples of the plurality of sensors 610 may include a location sensor to detect the geo-location of the vehicle, a real-time clock to provide date-time timestamp, a trip computing device, a vehicle speed sensor, an accelerometer, a carbon-emission sensor, a fuel consumption sensor, an engine revolution per minute (RPM) sensor, a temperature sensor, throttle position sensor, a pressure sensor, or a battery voltage sensor.

The electronic control unit (ECU) 612 may include suitable logic, circuitry, interfaces, and/or code that may be configured to control an operation of the first vehicle 102A. The ECU 612 may be a specialized electronic circuitry that may include an ECU processor to control different functions, such as, but not limited to, engine operations, communication operations, and data acquisition of the first vehicle 102A. Other examples of the ECU 612 may include, but are not limited to, a vehicle control system, an in-vehicle infotainment (IVI) system, an in-car entertainment (ICE) system, an automotive Head-up Display (HUD), an automotive dashboard, an embedded device, a smartphone, a human-machine interface (HMI), a computer workstation, a handheld computer, a cellular/mobile phone, a portable consumer electronic (CE) device, a server, and other computing devices. The electronic control device 102 may be included or integrated in the first vehicle 102A. The electronic control unit (ECU) 612 may communicate with the first server 600 or the first electronic device 104A to share the vehicle data or the user inputs, such as the geographical region 410, the time-period information, or selection of types of vehicle data or sensors.

A person of ordinary skill in the art will understand that the first vehicle 102A and the first server 600 depicted in FIG. 6 may also include other suitable components or systems, in addition to the components or systems which are illustrated herein to describe and explain the function and operation of the present disclosure. A detailed description for the other components or systems of the first vehicle 102A of the first server 600 is omitted from the disclosure for the sake of brevity.

In operation, the circuitry 602 of the first server 600 may receive the vehicle data 606 from the electronic control unit (ECU) 612 of the vehicles, such as the first vehicle 102A. The vehicle data 606 may be collected or captured by the plurality of sensors 610 of the first vehicle 102A. The circuitry 602 may be configured to receive or collect the vehicle data 606 directly from the electronic control unit (ECU) 612 of the first vehicle 102A, via the communication network 108. The circuitry 602 may be further configured to receive the first user input, such as which indicate the geographical region 410 on the displayed map data 402, from the first electronic device 104A associated with the first user 112A. The selection of the geographical region 410 as the first user input is described, for example, in FIG. 4A. The circuitry 602 may be further configured to extract geo-location information, such as the geo-location information 302, from the collected or stored vehicle data 606 as described, for example, in FIG. 4A. The circuitry 602 may be further configured to identify a first portion, such as the first portion 308 in FIG. 3, from the vehicle data 606 based on a first geo-location, such as "Location-L1" in the table 300, in the extracted geo-location information 302 of the vehicle data 606 and the indicated geographical region 410 in the received first user input. The circuitry 602 may compare the first geo-location in the extracted geo-location information 302 and the indicated geographical region 410 to determine whether the first geo-location lie within or correspond to the indicated geographical region 410. Based on the determination, the circuitry 602 may identify the first portion 308 as being captured in the first geo-location which is restricted, via the geographical region 410, by the first user 112A of the first electronic device 104A. The first portion 308 may be portion of the vehicle data 606 which the first user 112A does not want to be collected by the first server 600. Therefore, based on the received user input about the geographical region 410, the circuitry 602 may update the stored vehicle data 606 based on the identified first portion 308. For example, the circuitry 602 may remove or delete the first portion 308 from the collected vehicle data 606 so that the first server 600 may not further use the first portion 308 for further processing, such as data analysis for business purposes.

In some embodiments, the circuitry 602 may control (or restrict) the communication of the identified first portion 308 of the vehicle data 606 with the second server 614, which may be associated with a manufacturer of the first vehicle 102A, based on the inclusion of the first geo-location within the indicated geographical region 410. In some embodiments, the circuitry 602 may receive other user inputs, such as the third user input related to selection of the type of vehicle data or sensors, or the fourth user input related to selection of the time-period information, from the first electronic device 104A. Details of the third user input and the fourth user input are described, for example, in FIGS. 5A and 5B. The circuitry 602 may apply the received user inputs on the collected vehicle data 606 to further identify different portions, such as the first portion 308 or the second portion 310, from the vehicle data 606 based on received user inputs indicating different restriction (either location-based, time-based or type-based) to further update or remove the identified portions from the collected vehicle data 606.

In some embodiments, the collected vehicle data 606, such as previous trip information, may be accessed by the first user 112A at the first electronic device 104A. The first electronic device 104A may require unique user credentials from the first user 112A to access the vehicle data 606 stored on the first server 600. The vehicle data 606 may be collected from the first vehicle 102A which may also be associated or owned by the first user 112A. Based on the provided user credentials, the first server 600 may allow the first user 112A to view the vehicle data 606 and perform various data processing process, such as update various portions, remove or delete selected portions, or apply different rules for data selection or modifications. The first server 600 may store user profiles associated with the different users, such as the first user 112A, and associate the vehicle data 606 of the first vehicle 102A with the user profile of the first user 112A. The access to the vehicle data 606 may provide the first user 112A of the first electronic device 104A sufficient transparency or the visibility of the vehicle data 606 collected by the first server 600.

Figure 7:
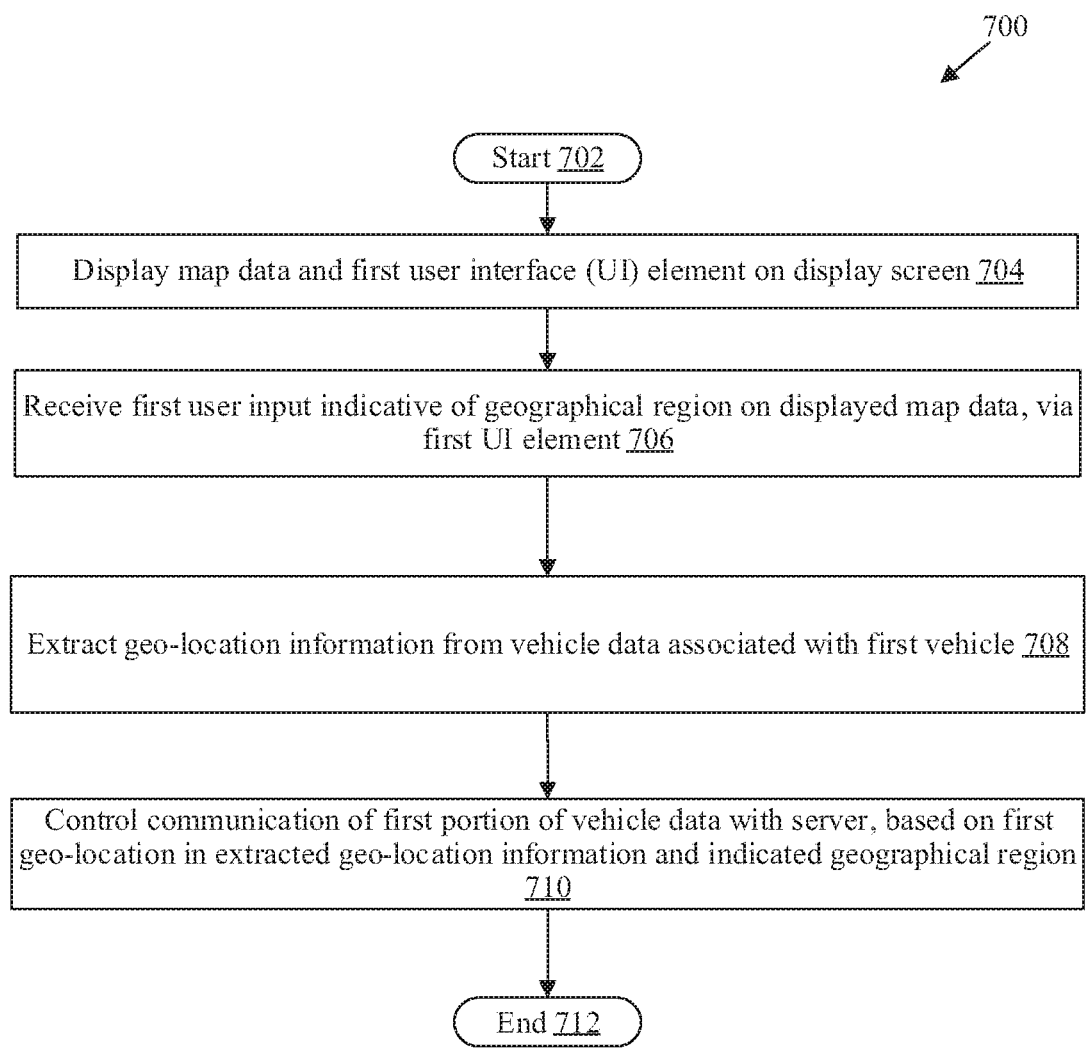
FIG. 7 depicts a flow chart that illustrates exemplary operations for an electronic device for user preference based vehicle data communication, in accordance with an embodiment of the disclosure.

FIG. 7 depicts a flow chart that illustrates exemplary operations for an electronic device for user preference based vehicle data communication, in accordance with an embodiment of the disclosure. With reference to FIG. 7, there is shown a flowchart 700. The flowchart 700 is described in conjunction with FIGS. 1, 2, 3, 4A, 4B, 5A, 5B, and 6. The operations from 702 to 712 may be implemented in one of the first electronic device 104A, or the circuitry 202. The operations of the flowchart 700 may start at 702 and proceed to 704.

At 704, map data and a first UI element may be displayed on a display screen. In an embodiment, the circuitry 202 may be configured to display the map data, such as the map data 402, and the first UI element, such as the first UI element 404, on the display screen 114 via the UI 400A. The display of the map data 402 and the first UI element 404 on the display screen 114 is described, for example, in FIG. 4A.

At 706, a first user input indicative of a geographical region on the displayed map data 402 may be received, via the first UI element 404. In an embodiment, the circuitry 202 may be configured to receive the first user input, via the first UI element 404. The first user input may indicate the geographical region, such as the geographical region 410, on the displayed map data 402. The reception of the first user input is described, for example, in FIG. 4A.

At 708, geo-location information may be extracted from the vehicle data associated with the first vehicle 102A. In an embodiment, the circuitry 202 may be configured to extract the geo-location information, such as the geo-location information 302 of the table 300 of FIG. 3, from the vehicle data, such as information in the table 300 of FIG. 3). The extraction of the geo-location information, such as the geo-location information 302, is described, for example, in FIGS. 3 and 4A.

At 710, a communication of a first portion of the vehicle data with the server 106 may be controlled, based on a first geo-location in the extracted geo-location information and the indicated geographical region. In an embodiment, the circuitry 202 may be configured to control the communication of the first portion, such as the first portion 308, of the vehicle data with the server 106, based on the first geo-location information and the indicated geographical region, such as the geographical region 410. The control of the communication of the first portion 308 of the vehicle data with the server 106 may be based on an inclusion of the first geo-location ("Location-L2") within the indicated geographical region, such as the geographical region 410. The control of the communication of the first portion 308 of the vehicle data may correspond to a restriction of the communication of the first portion 308 of the vehicle data with the server 106. The control of the communication of the first portion 308 of the vehicle data with the server 106 is described, for example, in FIG. 4A. Control passes to end 712.

Although the flowchart 700 is illustrated as discrete operations, such as 704, 706, 708, 710, and 712 the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 8:
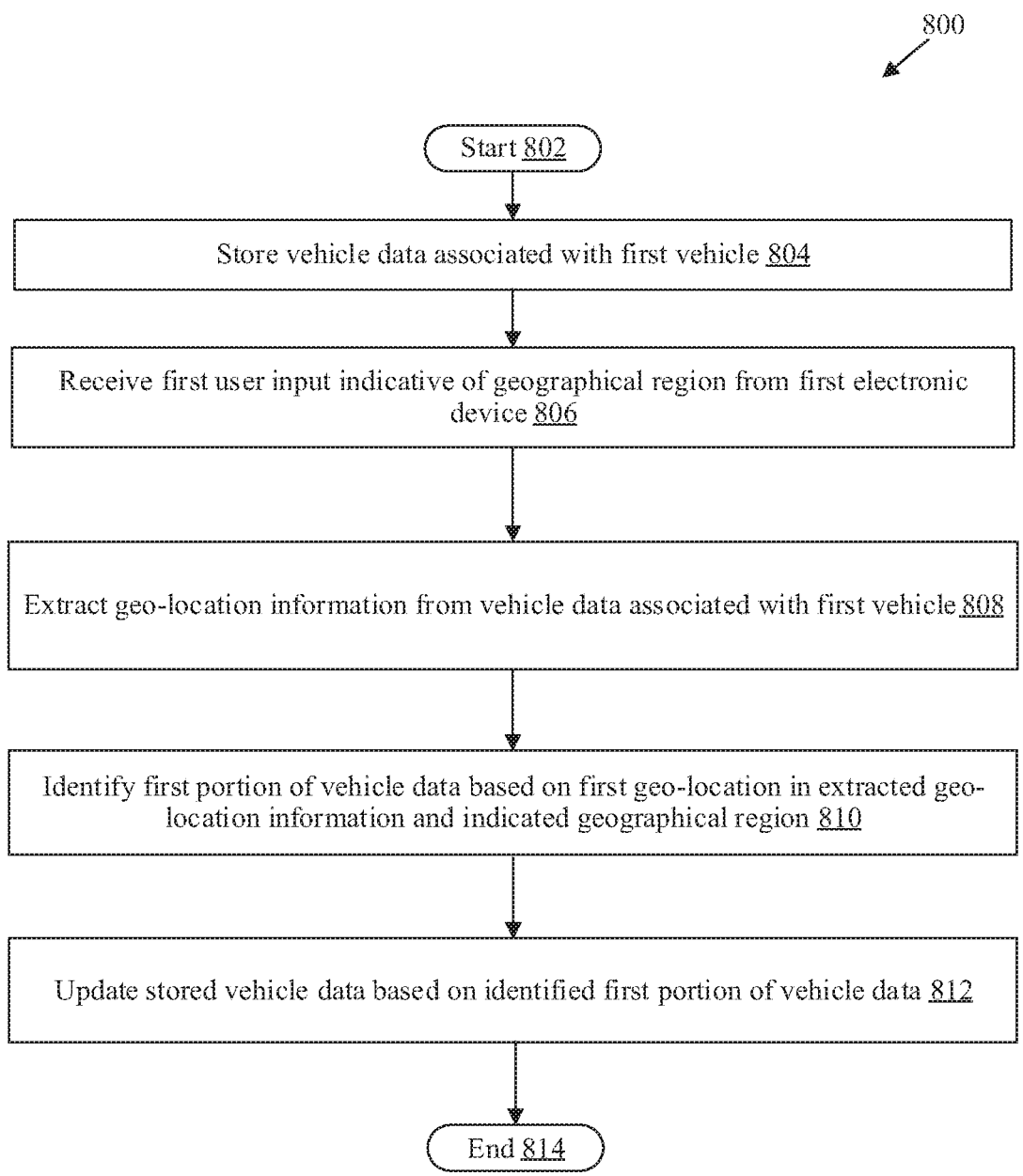
FIG. 8 depicts a flow chart that illustrates exemplary operations for a server for user preference based vehicle data control, in accordance with an embodiment of the disclosure.

FIG. 8 depicts a flow chart that illustrates exemplary operations for a server for user preference based vehicle data control, in accordance with an embodiment of the disclosure. With reference to FIG. 8, there is shown a flowchart 800. The flowchart 800 is described in conjunction with FIGS. 1, 2, 3, 4A, 4B, 5A, 5B, and 6. The operations from 802 to 812 may be implemented in one of the first server 600, or the circuitry 602 shown in FIG. 6. The operations of the flowchart 800 may start at 802 and proceed to 804.

At step 804, the vehicle data 606 associated with the first vehicle 102A may be stored. In an embodiment, the circuitry 602 of the first server 600 may be configured to receive the vehicle data 606 from the first vehicle 102A. The vehicle data 606 may be collected by the plurality of sensors 610 of the first vehicle 102A. The circuitry 602 may control the memory 604 to store the vehicle data 606 as described, for example, in FIG. 6.

At step 806, the first user input indicative of the geographical region 410 may be received from the first electronic device 104A. In an embodiment, the circuitry 602 of the first server 600 may be configured to receive the first user input indicative of the geographical region 410 from the first electronic device 104A as described, for example, in FIG. 6.

At step 808, the geo-location information 302 may be extracted from the vehicle data 606 associated with the first vehicle 102A. In an embodiment, the circuitry 602 of the first server 600 may be configured to extract the geo-location information 302 from the vehicle data 606 associated with the first vehicle 102A as described, for example, in FIG. 6.

At step 810, the first portion 308 of the vehicle data 606 may be identified based on a first geo-location in the extracted geo-location information 302 of the vehicle data 606 and the indicated geographical region 410. In an embodiment, the circuitry 602 of the first server 600 may be configured to identify the first portion 308 of the vehicle data 606 based on the first geo-location, such as "Location-L1" in FIG. 3, in the extracted geo-location information 302 of the vehicle data 606 and the indicated geographical region 410 received as the first user input from the first electronic device 104A as described, for example, in FIG. 6.

At step 812, the stored vehicle data 606 may be updated based on the identified first portion 308 of the vehicle data 606. In an embodiment, the circuitry 602 of the first server 600 may be configured to update (like delete) the identified first portion 308 in the stored vehicle data 606 based on the received first user input which may be indicative of the geographical region 410 as described, for example, in FIG. 6. Control passes to end 814.

Although the flowchart 800 is illustrated as discrete operations, such as 804, 806, 808, 810, 812, and 814 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (such as the first electronic device 104A) for user preference based vehicle data communication. The set of instructions may be executable by the machine and/or the computer to perform the steps that may comprise display of map data and a user interface (UI) element on a display screen. The steps may further comprise reception of a first user input, via the UI element. The first user input may indicate a geographical region on the displayed map data. The steps may further comprise extraction of geo-location information from vehicle data associated with a vehicle. The steps may further comprise control of a communication of a first portion of the vehicle data with a server based on a first geo-location in the extracted geo-location information of the vehicle data and the indicated geographical region. The first portion of the vehicle data may correspond to the first geo-location.

Various embodiments of the disclosure may provide a non-transitory, computer-readable medium and/or storage medium, and/or a non-transitory machine readable medium and/or storage medium stored thereon, a set of instructions executable by a machine and/or a computer (such as the first server 600) for user preference based vehicle data control. The set of instructions may be executable by the machine and/or the computer to perform the steps that may comprise storage of vehicle data associated with a vehicle. The steps may further comprise reception of a first user input from an electronic device, wherein the first user input indicates a geographical region. The steps may further comprise extraction of geo-location information from the vehicle data associated with a vehicle. The steps may further comprise identification of a first portion of the vehicle data based on a first geo-location in the extracted first geo-location information of the vehicle data and the indicated geographical region. The first portion of the vehicle data may correspond to the first geo-location. The steps may further comprise update of the stored vehicle data based on the identified first portion of the vehicle data.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An electronic device, comprising:
 a display screen configured to display map data and a first user interface (UI) element overlaid on the displayed map data, wherein
  the first UI element includes a plurality of drag points, each of the plurality of drag points on the first UI element corresponds to a geo-location of a plurality of geo-locations on the displayed map data, and
  the plurality of geo-locations is associated with the plurality of drag points; and
 circuitry coupled to the display screen, wherein the circuitry is configured to:
  receive a first user input, via the first UI element, on the displayed map data, wherein
   the first user input indicates a geographical region on the displayed map data, and
   the geographical region includes the plurality of geo-locations;
  extract geo-location information from vehicle data associated with a first vehicle; and
  control a communication of a first portion of the vehicle data with a server based on a first geo-location in the extracted geo-location information of the vehicle data and the indicated geographical region, wherein
  the first portion of the vehicle data corresponds to the first geo-location.

2. The electronic device according to claim 1, wherein the control of the communication of the first portion of the vehicle data with the server is based on an inclusion of the first geo-location within the indicated geographical region.

3. The electronic device according to claim 2, wherein the control of the communication of the first portion of the vehicle data corresponds to a restriction associated with the communication of the first portion of the vehicle data with the server.

4. The electronic device according to claim 1,
 wherein the circuitry is further configured to allow a communication of a second portion of the vehicle data with the server based on a second geo-location in the extracted geo-location information of the vehicle data and the indicated geographical region,
 wherein the second portion of the vehicle data corresponds to the second geo-location and is different from the first portion of the vehicle data, and
 wherein the second geo-location is outside the geographical region indicated by the first user input.

5. The electronic device according to claim 4, wherein the circuitry is further configured to control the communication of the first portion of the vehicle data or the communication of the second portion of the vehicle data, with an electronic control device of a second vehicle.

6. The electronic device according to claim 5, wherein the circuitry is further configured to receive driving behavior information or carbon emission information, associated with the first vehicle, from the server or from the electronic control device of the second vehicle.

7. The electronic device according to claim 4, wherein the circuitry is further configured to receive business information from the server, based on the communication of the second portion of the vehicle data with the server.

8. The electronic device according to claim 4, wherein the circuitry is further configured to receive reward information from the server based on the control of the communication of the first portion of the vehicle data or the communication of the second portion of the vehicle data.

9. The electronic device according to claim 1, wherein the received first user input indicates the geographical region based on a user-placement of the plurality of drag points on the displayed map data.

10. The electronic device according to claim 1, wherein the circuitry is further configured to:
 receive a second user input, via one of the plurality of drag points on the displayed map data; and
 update the geographical region based on the received second user input.

11. The electronic device according to claim 1,
 wherein the vehicle data of the first vehicle includes at least one of time-stamp information, the geo-location information, and vehicle-log information, and
 wherein the vehicle-log information includes at least one of: trip information, speed/velocity information, acceleration information, carbon-footprint information, fuel efficiency information, engine speed information, battery information, temperature information, vehicle model information, throttle position information, brakes information, pressure information, or driving behavior information, associated with the first vehicle.

12. The electronic device according to claim 1, wherein the circuitry is further configured to:
 control the display screen to display the vehicle data;
 receive a third user input, via a second set of UI elements on the display screen, wherein the third user input indicates a selection of a second portion of the vehicle data; and
 control a communication of the second portion of the vehicle data with the server based on the received third user input.

13. The electronic device according to claim 1, wherein the circuitry is further configured to:

receive a fourth user input, via a third UI element on the display screen, wherein the fourth user input indicates time-period information;
extract time-stamp information from the vehicle data; and
control the communication of the first portion of the vehicle data with the server based on a first time-period in the extracted time-stamp information and the indicated time-period information, wherein the first portion of the vehicle data corresponds to the first time-period.

14. A first server, comprising:
a memory configured to store vehicle data associated with a vehicle; and
circuitry coupled to the memory, wherein the circuitry is configured to:
receive a first user input from an electronic device, wherein
the first user input is received via a user interface element overlaid on map data displayed on the electronic device,
the user interface element includes a plurality of drag points,
each of the plurality of drag points on the user interface element corresponds to a geo-location of a plurality of geo-locations on the displayed map data,
the plurality of geo-locations is associated with the plurality of drag points,
the first user input indicates a geographical region on the map data, and
the geographical region includes the plurality of geo-locations;
extract geo-location information from the vehicle data associated with the vehicle;
identify a first portion of the vehicle data based on a first geo-location in the extracted geo-location information of the vehicle data and the indicated geographical region, wherein the first portion of the vehicle data corresponds to the first geo-location; and
update the stored vehicle data based on the identified first portion of the vehicle data.

15. The first server according to claim 14, wherein the circuitry is further configured to delete the first portion of the vehicle data to update the vehicle data based on an inclusion of the first geo-location within the indicated geographical region.

16. The first server according to claim 14, wherein the circuitry is further configured to control a communication of the identified first portion of the vehicle data with a second server based on an inclusion of the first geo-location within the indicated geographical region, and wherein the control corresponds to a restriction of the communication of the identified first portion of the vehicle data with the second server.

17. The first server according to claim 14, wherein the circuitry is further configured to:
receive a third user input from the electronic device, wherein the third user input indicates a selection of a second portion of the vehicle data; and
update the stored vehicle data based on the selected second portion of the vehicle data.

18. The first server according to claim 14, wherein the circuitry is further configured to:
receive a fourth user input from the electronic device, wherein the fourth user input indicates time-period information;
extract time-stamp information from the vehicle data;
identify the first portion of the vehicle data based on a first time-period in the extracted time-stamp information of the vehicle data and the indicated time-period information, wherein the first portion of the vehicle data corresponds to the first time-period; and
update the stored vehicle data based on the identified first portion of the vehicle data.

19. A method, comprising:
in an electronic device which comprises a display screen configured to display map data and a user interface (UI) element overlaid on the displayed map data, wherein
the first UI element includes a plurality of drag points,
each of the plurality of drag points on the first UI element corresponds to a geo-location of a plurality of geo-locations on the displayed map data, and
the plurality of geo-locations is associated with the plurality of drag points:
receiving a first user input, via the UI element, on the displayed map data, wherein
the first user input indicates a geographical region on the displayed map data, and
the geographical region includes the plurality of geo-locations;
extracting geo-location information from vehicle data associated with a vehicle; and
controlling a communication of a first portion of the vehicle data with a server based on a first geo-location in the extracted geo-location information of the vehicle data and the indicated geographical region, wherein the first portion of the vehicle data corresponds to the first geo-location.

* * * * *